United States Patent
Yoshizawa

(10) Patent No.: US 10,355,806 B2
(45) Date of Patent: Jul. 16, 2019

(54) CONTROL DEVICE AND CONTROL METHOD FOR SPARSE CODE MULTIPLE ACCESS

(71) Applicant: SONY CORPORATION, Tokyo (JP)

(72) Inventor: Atsushi Yoshizawa, Kanagawa (JP)

(73) Assignee: SONY CORPORATION, Tokyo (JP)

(*) Notice: Subject to any disclaimer, the term of this patent is extended or adjusted under 35 U.S.C. 154(b) by 32 days.

(21) Appl. No.: 15/531,986

(22) PCT Filed: Sep. 24, 2015

(86) PCT No.: PCT/JP2015/076941
§ 371 (c)(1),
(2) Date: May 31, 2017

(87) PCT Pub. No.: WO2016/098413
PCT Pub. Date: Jun. 23, 2016

(65) Prior Publication Data
US 2017/0331582 A1 Nov. 16, 2017

(30) Foreign Application Priority Data

Dec. 17, 2014 (JP) ................................. 2014-255038

(51) Int. Cl.
*H04J 99/00* (2009.01)
*H04B 7/04* (2017.01)
(Continued)

(52) U.S. Cl.
CPC .............. *H04J 15/00* (2013.01); *H04B 1/707* (2013.01); *H04B 7/04* (2013.01); *H04J 11/00* (2013.01);
(Continued)

(58) Field of Classification Search
CPC .............. H04B 7/04; H04J 15/00; H04J 13/10
See application file for complete search history.

(56) References Cited

U.S. PATENT DOCUMENTS

| 2010/0316153 A1 | 12/2010 | Wang et al. |
| 2012/0127869 A1* | 5/2012 | Yin ...................... H04L 1/0031 370/252 |

(Continued)

FOREIGN PATENT DOCUMENTS

| CN | 101971551 A | 2/2011 |
| CN | 104798317 A | 7/2015 |

(Continued)

OTHER PUBLICATIONS

Nikopour, et al., "Sparse Code Multiple Access", 2013 IEEE 24th International Symposium on Personal, Indoor and Mobile Radio Communications: Fundamentals and PHY Track, 2013, 332-336 pages.

(Continued)

*Primary Examiner* — Chi H Pham
*Assistant Examiner* — Weibin Huang
(74) *Attorney, Agent, or Firm* — Chip Law Group

(57) ABSTRACT

A device for controlling sparse code multiple access is described. The device includes a generation unit configured to generate, for each of a plurality of layers that are subject to non-orthogonal multiplexing using a codebook, a codeword of a layer from data of the layer on the basis of a codebook for a layer, and an adjustment unit configured to adjust a radio resource to be used in transmission of a signal element included in a multiplexed codeword obtained by multiplexing of codewords of the plurality of layers.

17 Claims, 28 Drawing Sheets

(51) Int. Cl.
*H04J 11/00* (2006.01)
*H04J 13/10* (2011.01)
*H04B 1/707* (2011.01)
*H04J 13/00* (2011.01)
*H04L 1/00* (2006.01)
*H04L 1/04* (2006.01)
*H04L 27/26* (2006.01)

(52) U.S. Cl.
CPC .......... *H04J 13/0074* (2013.01); *H04J 13/10* (2013.01); *H04L 1/0071* (2013.01); *H04L 1/04* (2013.01); *H04L 27/2602* (2013.01)

(56) References Cited

U.S. PATENT DOCUMENTS

| | | | |
|---|---|---|---|
| 2013/0100935 A1* | 4/2013 | Zhou | H04W 72/082 |
| | | | 370/335 |
| 2014/0140360 A1* | 5/2014 | Nikopour | H04J 13/00 |
| | | | 370/479 |
| 2015/0043540 A1* | 2/2015 | Nikopour | H04J 11/00 |
| | | | 370/335 |
| 2015/0312074 A1* | 10/2015 | Zhu | H04L 27/2627 |
| | | | 370/329 |
| 2016/0049999 A1* | 2/2016 | Taherzadeh Boroujeni | |
| | | | H04J 13/16 |
| | | | 370/335 |

FOREIGN PATENT DOCUMENTS

| | | |
|---|---|---|
| JP | 2011-517391 A | 6/2011 |
| KR | 10-2010-0139003 A | 12/2010 |
| KR | 10-2015-0085026 A | 7/2015 |
| WO | 2009/113012 A2 | 9/2009 |
| WO | 2014/075637 A1 | 5/2014 |

OTHER PUBLICATIONS

International Search Report and Written Opinion of PCT Application No. PCT/JP2015/076941, dated Nov. 10, 2015, 01 pages of English Translation and 06 pages of ISRWO.

Nikopour, et al., "Sparse Code Multiple Access", IEEE 24th International Symposium on Personal, Indoor and Mobile Radio Communications: Fundamentals and PHY Track, 2013, pp. 332-336.

* cited by examiner

FIG. 3

CODE BLOCK 1

$(0,0) \Rightarrow x_{11} = (x_{111}, x_{112}, 0, 0)$
$(0,1) \Rightarrow x_{12} = (x_{121}, x_{122}, 0, 0)$
$(1,0) \Rightarrow x_{13} = (x_{131}, x_{132}, 0, 0)$
$(1,1) \Rightarrow x_{14} = (x_{141}, x_{142}, 0, 0)$

CODE BLOCK 2

$(0,0) \Rightarrow x_{21} = (0, 0, x_{213}, x_{214})$
$(0,1) \Rightarrow x_{22} = (0, 0, x_{223}, x_{224})$
$(1,0) \Rightarrow x_{23} = (0, 0, x_{233}, x_{234})$
$(1,1) \Rightarrow x_{24} = (0, 0, x_{243}, x_{244})$

CODE BLOCK 3

$(0,0) \Rightarrow x_{31} = (x_{311}, 0, x_{313}, 0)$
$(0,1) \Rightarrow x_{32} = (x_{321}, 0, x_{323}, 0)$
$(1,0) \Rightarrow x_{33} = (x_{331}, 0, x_{333}, 0)$
$(1,1) \Rightarrow x_{34} = (x_{341}, 0, x_{343}, 0)$

CODE BLOCK 4

$(0,0) \Rightarrow x_{41} = (0, x_{412}, 0, x_{414})$
$(0,1) \Rightarrow x_{42} = (0, x_{422}, 0, x_{424})$
$(1,0) \Rightarrow x_{43} = (0, x_{432}, 0, x_{434})$
$(1,1) \Rightarrow x_{44} = (0, x_{442}, 0, x_{444})$

CODE BLOCK 5

$(0,0) \Rightarrow x_{51} = (x_{511}, 0, 0, x_{514})$
$(0,1) \Rightarrow x_{52} = (x_{521}, 0, 0, x_{524})$
$(1,0) \Rightarrow x_{53} = (x_{531}, 0, 0, x_{534})$
$(1,1) \Rightarrow x_{54} = (x_{541}, 0, 0, x_{544})$

CODE BLOCK 6

$(0,0) \Rightarrow x_{61} = (0, x_{612}, x_{613}, 0)$
$(0,1) \Rightarrow x_{62} = (0, x_{622}, x_{623}, 0)$
$(1,0) \Rightarrow x_{63} = (0, x_{632}, x_{633}, 0)$
$(1,1) \Rightarrow x_{64} = (0, x_{642}, x_{643}, 0)$

CONTROL DEVICE AND CONTROL METHOD FOR SPARSE CODE MULTIPLE ACCESS

CROSS REFERENCE TO RELATED APPLICATIONS

This application is a U.S. National Phase of International Patent Application No. PCT/JP2015/076941 filed on Sep. 24, 2015, which claims priority benefit of Japanese Patent Application No. JP 2014-255038 filed in the Japan Patent Office on Dec. 17, 2014. Each of the above-referenced applications is hereby incorporated herein by reference in its entirety.

TECHNICAL FIELD

The present invention relates to a device.

BACKGROUND ART

In recent years, various new radio access schemes have been discussed in various fields for the next $5^{th}$ generation radio scheme of Long Term Evolution (LTE). In particular, non-orthogonal multiplexing and non-orthogonal multiple access have been discussed. Amid this situation, a new multiple access scheme called sparse code multiple access (SCMA) has been proposed.

Non-patent Literature 1, for example, discloses SCMA. In addition, Patent Literature 1, for example, discloses examples of a codeword generation technique using codebooks of SCAM and a designing technique of codebooks.

CITATION LIST

Patent Literature

Patent Literature 1: US Patent Application Publication No. 2014/0140360

Non-Patent Literature

Non-Patent Literature 1: Sparse Code Multiple Access, in 2013 IEEE $24^{th}$ International Symposium on Personal, Indoor and Mobile Communications

DISCLOSURE OF INVENTION

Technical Problem

In SCMA, codewords including a plurality of signal elements are generated on the basis of a codebook. In addition, each signal element in codewords of a plurality of layers is mapped to a corresponding radio resource (after or before multiplexing).

However, when fading becomes significant in a specific radio resource (for example, a specific frequency resource), for example, influence thereof on data of a specific layer increases. As a result, a reception side fails in interference cancellation or decoding, a serious bit error occurs, and thus re-transmission may be necessary. This can lead to an extension of transmission latency and/or a drop in throughput.

Thus, it is desirable to provide a mechanism which enables communication to be performed more favorably when non-orthogonal multiplexing using a codebook is used.

Solution to Problem

According to the present disclosure, there is provided a device including: a generation unit configured to generate, for each of a plurality of layers that are subject to non-orthogonal multiplexing using a codebook, a codeword of a layer from data of the layer on the basis of a codebook for the layer; and an adjustment unit configured to adjust a radio resource to be used in transmission of a signal element included in a multiplexed codeword obtained by multiplexing of codewords of the plurality of layers.

According to the present disclosure, there is provided a method performed by a processor, the method including: generating, for each of a plurality of layers that are subject to non-orthogonal multiplexing using a codebook, a codeword of a layer from data of the layer on the basis of a codebook for the layer; and adjusting a radio resource to be used in transmission of a signal element included in a multiplexed codeword obtained by multiplexing of codewords of the plurality of layers.

According to the present disclosure, there is provided a device including: an acquisition unit configured to acquire information regarding adjustment of a radio resource to be used in transmission of a signal element included in a multiplexed codeword obtained by multiplexing of codewords of a plurality of layers; and a control unit configured to perform a reception process of a terminal device on the basis of the information. The plurality of layers are layers that are subject to non-orthogonal multiplexing using a codebook, and each of the codewords of the plurality of layers is a codeword generated from data of a layer on the basis of a codebook for the layer.

According to the present disclosure, there is provided a device including: a generation unit configured to generate, on the basis of a codebook for a layer that is subject to non-orthogonal multiplexing using a codebook, a codeword of the layer from data of the layer; and an adjustment unit configured to adjust a radio resource to be used in transmission of a signal element included in the codeword.

Advantageous Effects of Invention

According to the present disclosure described above, it is possible to perform communication more favorably when non-orthogonal multiplexing using a codebook is used. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3 is an explanatory diagram for describing examples of codebooks.

MODE(S) FOR CARRYING OUT THE INVENTION

Figure 1:
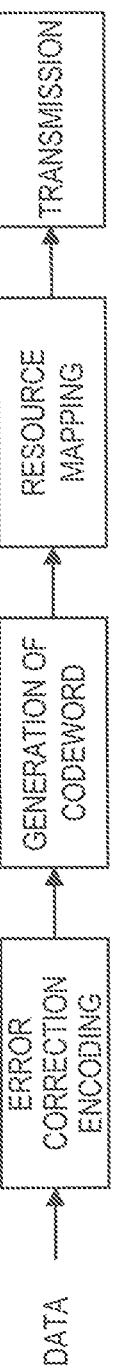
FIG. 1 is an explanatory diagram for describing an example of a schematic process of SCMA.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. Introduction
1.1. SCMA
1.2. Technical problem
2. Schematic configuration of system
3. First Embodiment
3.1. Configuration of base station
3.2. Configuration of terminal device
3.3. Technical features
3.4. Process flow
4. Second Embodiment
4.1. Configuration of base station
4.2. Configuration of terminal device
4.3. Technical features
4.4. Process flow
5. Application examples
5.1. Application examples with respect to base station
5.2. Application example with respect to terminal device
6. Conclusion 1. Introduction As an introduction, SCMA and technical problems will be described with reference to FIGS. 1 to 9.
<1.1. SCMA>
First, SCMA will be described with reference to FIGS. 1 to 8.
(1) Overview
(a) Schematic Process Flow
FIG. 1 is an explanatory diagram for describing an example of a schematic process of SCMA.

In SCMA, for example, error correction encoding is performed and codewords are generated from data (binary data) that has undergone the error correction encoding on the basis of a codebook. Specifically, the codebook is, for example, information indicating correspondences between data candidates and codewords, and the data is converted into a codeword corresponding to the data in the codebook. Note that codebooks for each layer are prepared for the purpose of layer separation.

Further, each signal element included in the generated codewords is mapped to a corresponding radio resource. For example, codewords of a plurality of layers are multiplexed first, and then each signal element included in the multiplexed codewords is mapped to a corresponding radio resource. Alternatively, for each of a plurality of layers, each signal element included in codewords of the layers may be mapped to a corresponding radio resource, and then two or more signal elements mapped to the same radio resource (i.e., signal elements of different layers) may be multiplexed.

Then, the signal elements mapped to the radio resource are transmitted.

Figure 2:
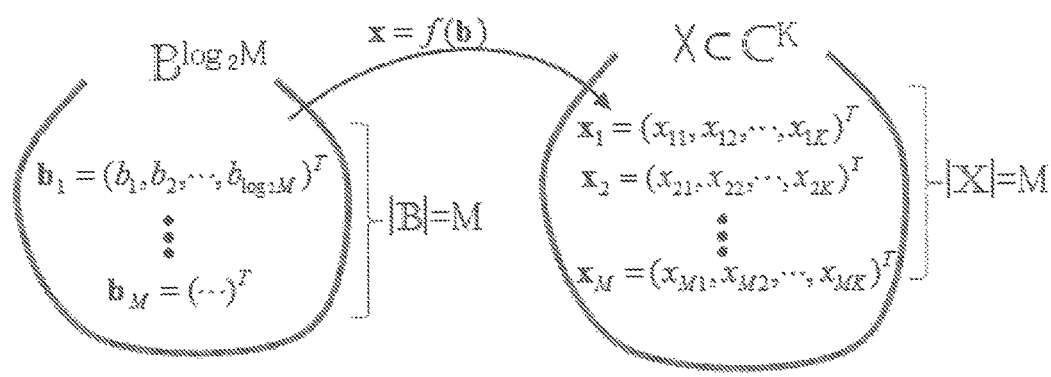
FIG. 2 is an explanatory diagram for describing an example of generation of codewords based on codebooks.

As described above, codewords of a plurality of layers are transmitted on the same radio resource. That is, the radio resource is shared by the plurality of layers. For this reason, SCMA is a non-orthogonal access scheme, not an orthogonal access scheme like OFDMA.
(b) Generation of Codewords
FIG. 2 is an explanatory diagram for describing an example of generation of codewords based on codebooks. Referring to FIG. 2, data candidates $b_i$ and codewords $x_j$ are shown. Sizes of the codebooks, i.e., the number of data candidates $b_i$ and the number of codewords $x_j$, are both M. In this case, data that is input information is, for example, a vector including bits as elements and has a length of $\log_2 M$. In addition, a codeword that is output information is a vector including a complex number as a signal element and has the same length as the number of radio resources K to be used in transmission of codewords. Thus, a codebook can also be said to be a function in which input information and output information are both vectors. The codewords that are output information are required to satisfy a desired condition suitable for layer multiplexing.

(c) Example of Codebooks

FIG. 3 is an explanatory diagram for describing examples of codebooks. Referring to FIG. 3, codebooks 1 to 6 are shown. The codebooks 1 to 6 are codebooks for Layer 1 to Layer 6. As such, codebooks for each layer are prepared in SCMA. In this example, data that is input information is 2-bit data, and the number of data candidates is 4. Thus, the number of codewords in each codebook is also 4. 2 of 4 signal elements (i.e., complex numbers) are 0 in a codeword of each codebook, and 2 different codewords are sparse. In addition, 2 of the four signal elements in the codeword of each codebook are not 0. That is, the number of signal elements N that are not 0 among the 4 signal elements is 2.

(d) Example of Resource Mapping

Figure 4:
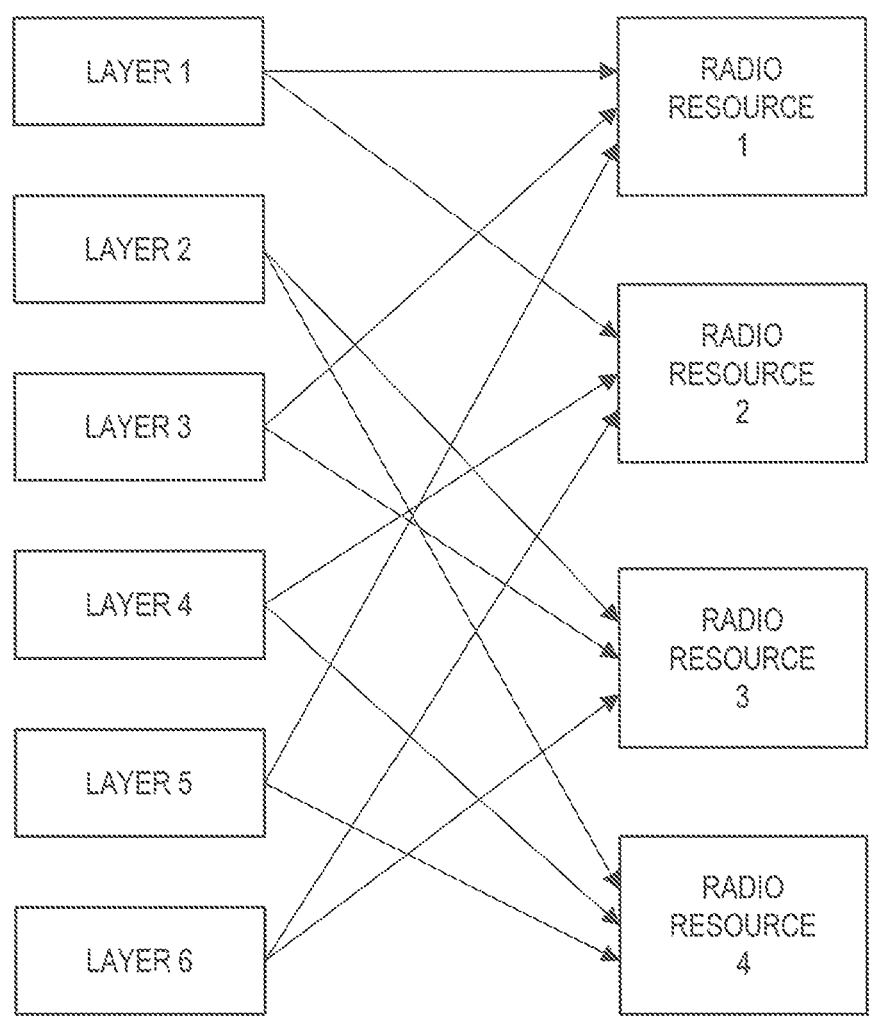
FIG. 4 is an explanatory diagram for describing an example of resource mapping of codebooks.

FIG. 4 is an explanatory diagram for describing an example of resource mapping of codebooks. Referring to FIG. 4, 6 layers and 4 radio resources are shown. In this example, the number of signal elements in a codeword of each layer is 4, and thus 4 radio resources are prepared. For example, signal elements that are not 0 (i.e., 2 signal elements) among 4 signal elements included in the codeword of each layer are mapped to corresponding radio resources. Specifically, for example, a $1^{st}$ signal element in a codeword of Layer 1 is mapped to radio resource 1, and a $2^{nd}$ signal element in the codeword of Layer 1 is mapped to radio resource 2. A $1^{st}$ signal element in a codeword of Layer 3 is, for example, mapped to radio resource 1, and a $3^{rd}$ signal element in the codeword of Layer 3 is mapped to radio resource 3.

In this example, an allowable number of layers J is equal to 2 combinations among the 4 radio resources ($_4C_2=6$). When 6 layers are mapped to 4 radio resources as above, realized overhead is 150%.

(e) Process on Reception Side

In SCMA, a transmission side performs multiplexing of sparse codewords as described above. Meanwhile, a technique called, for example, a message passing algorithm using an iterative operation is used on a reception side. According to the message passing technique, a reception device refers to, for example, reception signals of 4 radio resources and estimates an input vector that maximizes a posterior probability of the reception signals.

More generally, for example, codewords of J layers are mapped to K radio resources. In this case, if a codeword of a j-th layer is indicated as $x_j=(x_{1j}, x_{Kj})$, a reception signal $y_k$ on a k-th radio resource is expressed as below.

$$y_k = h_k \sum_{j=1}^{J} x_{kj} + n_k \qquad \text{[Math. 1]}$$

Here, $h_k$ represents a channel characteristic of the k-th radio resource, and $n_k$ represents a noise component added to the k-th radio resource. In this case, X^ below is an estimated value of an input vector $X=(x_1, x_2, \ldots, x_J)$.

$$\hat{X} = \underset{x}{\mathrm{argmax}}\, p(X \mid y) \qquad \text{[Math. 2]}$$

In order to realize this, the reception side uses successive interference cancellation (SIC). In SIC, the reception device sequentially cancels reception signals of other layers as interference components in the course of demodulating reception signals of a certain layer. Through such a process, reception signals of the layers are separated and a reception signal of a desired layer is obtained.

(2) Design of Optimum Codebook

As one difficulty in SCMA, designing of an optimum codebook is exemplified. To design an optimum codebook, it is necessary to select an optimum combination from among an extremely large number of constellation combinations in consideration of a tradeoff between an inter-signal distance and signal energy.

However, if K and N which are parameters of codewords are set to be high values, an amount of calculation required to select the optimum combination becomes enormous, and thus the selection becomes difficult.

Thus, a codebook of SCMA is generally designed using a large-scale calculator to design a system. Therefore, when an SCMA system is operated, codewords are generated on the basis of codebooks designed in advance in that way.

(3) Resource Mapping

It is generally desirable for the number of layers J to be greater to accommodate a large number of terminal devices. To make the number of layers J greater, it is necessary to set K and N to be greater.

(a) Mapping to Whole Carrier Frequency

Setting the number of subcarriers included in a whole carrier frequency band to a length of a codeword, for example, is considered. A specific example thereof will be described below with reference to FIG. 5.

Figure 5:
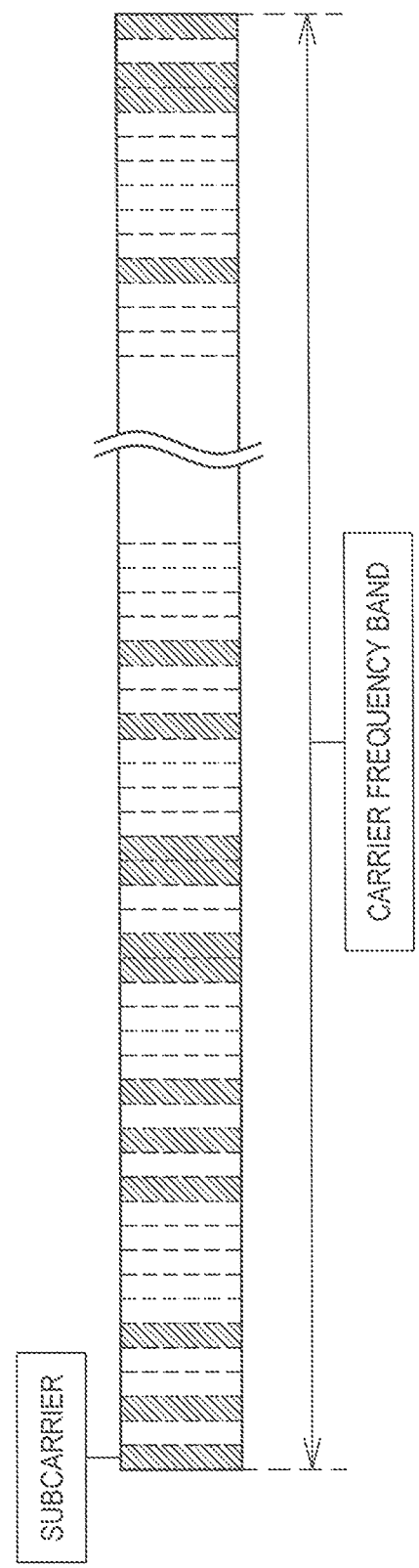
FIG. 5 is an explanatory diagram for describing an example of a case in which the number of subcarriers included in a whole carrier frequency band is set to a length of a codeword.

FIG. 5 is an explanatory diagram for describing an example of a case in which the number of subcarriers included in a whole carrier frequency band is set to a length of a codeword. Referring to FIG. 5, a carrier frequency band is shown. The carrier frequency band includes a large number of subcarriers. In this example, the number of subcarriers included in the carrier frequency band is a length of a codeword and is the number of radio resources K to be used in transmission of the codeword. In this case, a codeword of a certain layer is mapped to N subcarriers (the hatched portion in FIG. 5) among K subcarriers. In other words, N signal elements that are not 0 included in the codeword are mapped to the N subcarriers. Note that a sparse codeword is guaranteed by setting N to be sufficiently smaller than K.

In such a case, an amount of calculation required to select an optimum codebook becomes extremely large due to the very large K. Thus, it may be difficult to complete the calculation even using a large-scale calculator. Note that, although obtaining a quasi-optimum solution (a codebook) under a certain restricted condition is also considered in order to reduce an amount of calculation, obtaining a quasi-optimum solution of a desired level may also be difficult due to a size of a search space for an optimum solution.

In addition, since a codeword is required to be sparse with respect to other codewords, N is smaller than K. For this reason, a communication speed per layer can be significantly restricted in a carrier frequency band.

(b) Mapping to Blocks

In consideration of the concerns described above, mapping a codeword to blocks including a predetermined number of subcarriers, for example, is considered. In other words, setting the number of subcarriers included in the block to a length of a codeword is considered. A specific example thereof will be described below with reference to FIG. 6.

Figure 6:
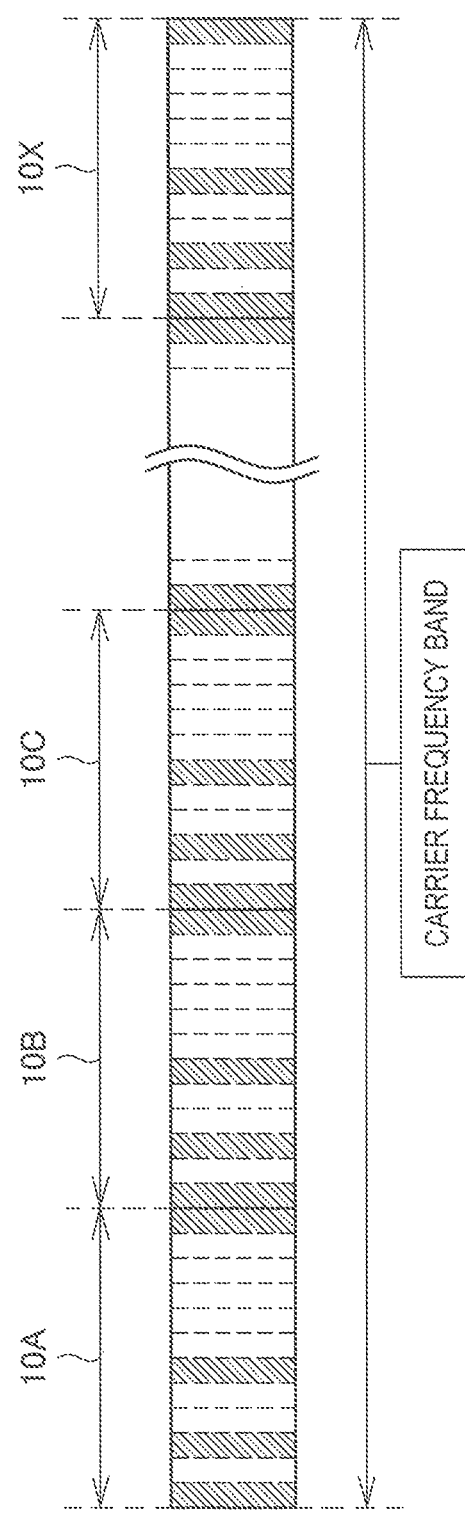
FIG. 6 is an explanatory diagram for describing an example of a case in which the number of subcarriers included in blocks is set to a length of a codeword.

FIG. 6 is an explanatory diagram for describing an example of a case in which the number of subcarriers included in blocks is set to a length of a codeword. Referring to FIG. 6, a carrier frequency band is shown. The carrier frequency band includes a plurality of blocks 10 each including a predetermined number of subcarriers. As an example, a block 10 is a resource block and includes 12 subcarriers. A length of a codeword in this case is 12, and the number of radio resources to be used in transmission of a codeword is also 12. In this case, 4 signal elements that are not 0 in a codeword of each layer are mapped to 4 among the 12 subcarriers. For example, a codeword of a certain layer is mapped to $1^{st}$, $3^{rd}$, $6^{th}$, and $12^{th}$ subcarriers (the hatched portions in FIG. 6) among the 12 subcarriers included in each block 10.

Since K and N are small in such a case, selecting an optimum codebook is easier.

Note that, although the case in which the blocks in the whole carrier frequency band are used for communication of SCMA has been described in the example of FIG. 6, only blocks included in a part of the carrier frequency band may be used for communication of SCMA. In this case, the rest of the carrier frequency band may be used for another type of communication (e.g., communication in OFDMA).

(c) Mapping of Codewords of Layers

Codewords of a plurality of layers are mapped to, for example, radio resources of blocks. A specific example of this subject will be described below with reference to FIGS. 7 and 8.

Figure 7:
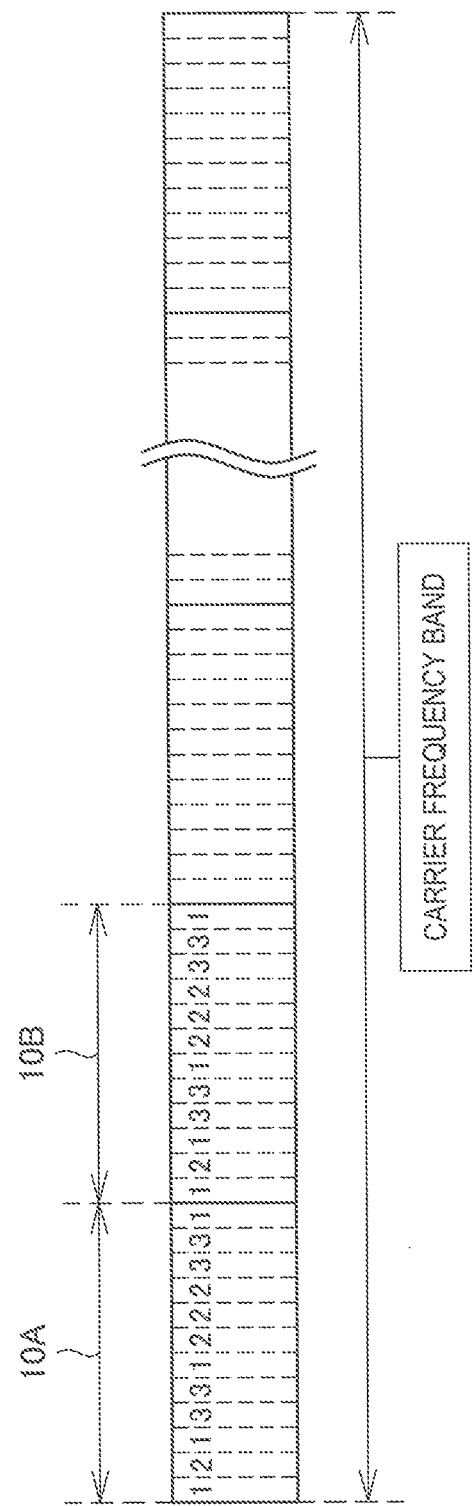
FIG. 7 is an explanatory diagram for describing an example in which codewords of 3 layers are mapped to radio resources of blocks.

FIG. 7 is an explanatory diagram for describing an example in which codewords of 3 layers are mapped to radio resources of blocks. In this example, a codeword of layer 1 is mapped to $1^{st}$, $3^{rd}$, $6^{th}$ and $12^{th}$ subcarriers among 12 subcarriers in each block 10. A codeword of Layer 2 is mapped to $2^{nd}$, $7^{th}$, $8^{th}$, and $9^{th}$ subcarriers among the 12 subcarriers in each block 10. A codeword of Layer 3 is mapped to $4^{th}$, $5^{th}$, $10^{th}$, and $11^{th}$ subcarriers among the 12 subcarriers in each block 10. Since the number of layers is smaller than the number of radio resources in this example, the radio resources do not overlap between the codewords of the different layers. Thus, inter-layer interference can be avoided.

Figure 8:
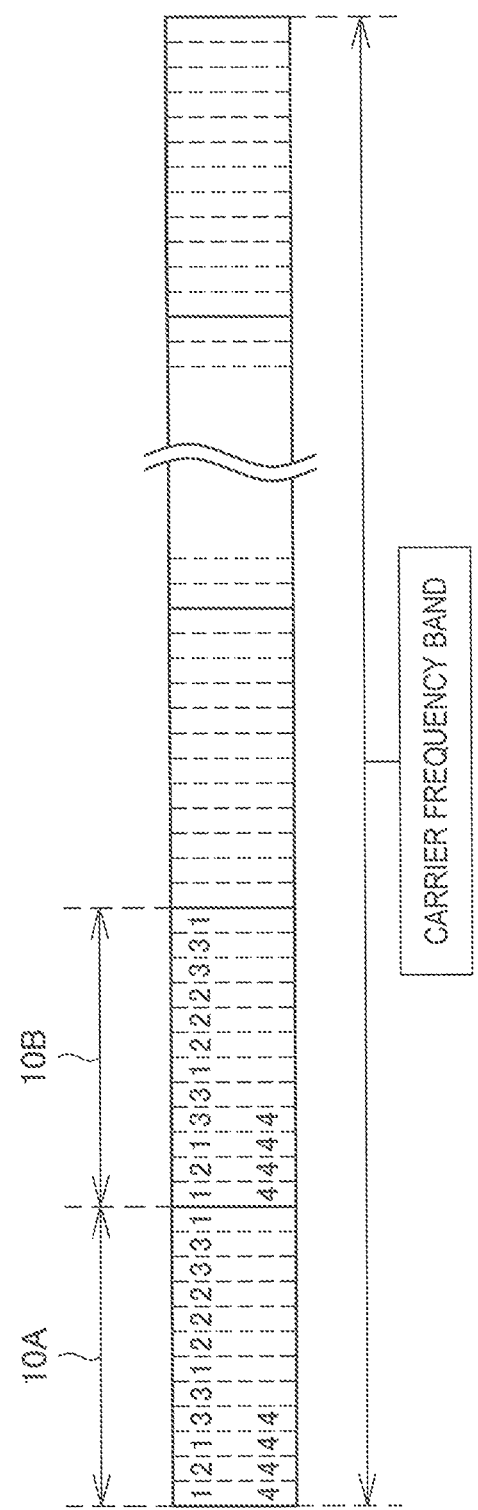
FIG. 8 is an explanatory diagram for describing an example in which codewords of 4 layers are mapped to radio resources of blocks.

FIG. 8 is an explanatory diagram for describing an example in which codewords of 4 layers are mapped to radio resources of blocks. In this example, codewords of Layer 4 are further mapped to the $1^{st}$, $2^{nd}$, $3^{rd}$, and $4^{th}$ subcarriers among the 12 subcarriers in each block 10. The radio resources overlap between the codeword of Layer 4 and the codewords of other layers in this case. Thus, although inter-layer interference occurs, a larger number of terminal devices can be accommodated due to an increase in the number of layers.

Note that, although mapping only to the blocks 10A and 10B is described in FIGS. 7 and 8 for the sake of simplicity, mapping can of course be performed on, for example, other blocks 10.

As mapping of codewords to radio resources, for example, codewords of a plurality of layers are multiplexed first, and then the multiplexed codewords are mapped to radio resources. Alternatively, as mapping of codewords to radio resources, codewords of a plurality of layers may be mapped to radio resources for each of the layers, and then two or more signal elements mapped to the same radio resources (i.e., signal elements of different layers) may be multiplexed.

<1.2. Technical Problems>

Next, technical problems according to an embodiment of the present disclosure will be described next with reference to FIG. 9.

In SCMA, codewords including a plurality of signal elements are generated on the basis of codebooks as described above. Then, each of signal elements in the codewords of a plurality of layers is mapped to a corresponding radio resource (after or before multiplexing).

However, when fading becomes significant in a specific radio resource (for example, a specific frequency resource), for example, influence thereof on data of a specific layer increases. As a result, a reception side fails in interference cancellation or decoding, a serious bit error occurs, and thus re-transmission may be necessary. This can lead to an extension of transmission latency and/or a drop in throughput. A specific example of this subject will be described below with reference to FIG. 9.

Figure 9:
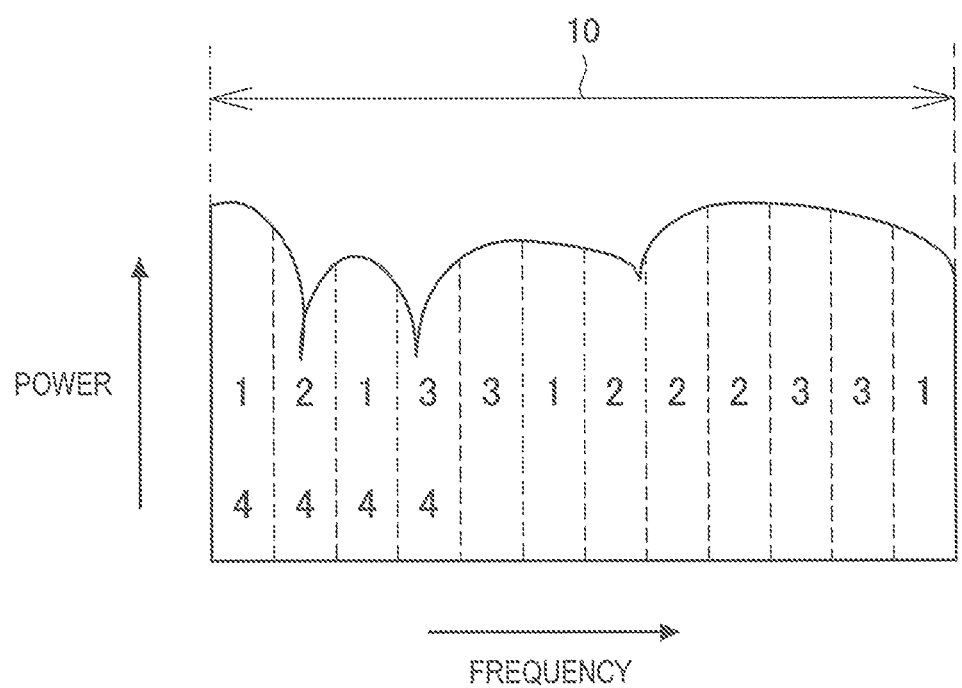
FIG. 9 is an explanatory diagram for describing an example of influence of fading on SCMA.

FIG. 9 is an explanatory diagram for describing an example of influence of fading on SCMA. Referring to FIG. 9, levels of reception power of 12 subcarriers included in a block 10 are shown. In this example, fading is significant in, for example, the $2^{nd}$ subcarrier to which signal elements of codewords of Layers 2 and 4 are mapped and the $4^{th}$ subcarrier to which signal elements of codewords of Layers 3 and 4 are mapped. Thus, the influence on data of Layer 4 increases. As a result, a reception side fails in interference cancellation (e.g., cancellation of signal elements of Layer 4) or decoding (e.g., decoding of the data of Layer 4), and thus a serious bit error can occur.

Thus, it is desirable to provide a mechanism which enables communication to be performed more favorably when non-orthogonal multiplexing using a codebook is used.

2. Schematic Configuration of System

Figure 10:
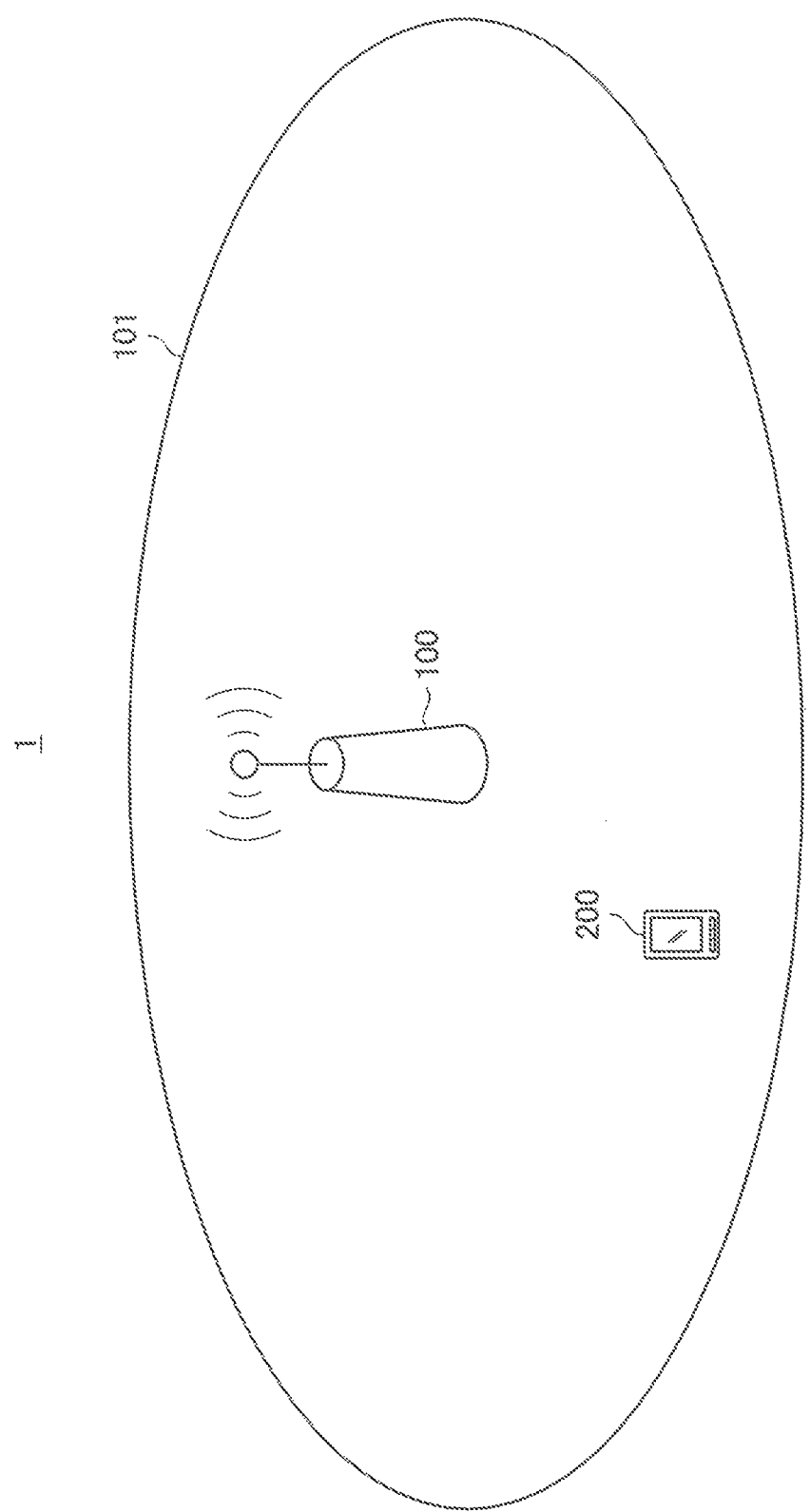
FIG. 10 is an explanatory diagram illustrating an example of a schematic configuration of a system according to an embodiment of the present disclosure.

A schematic configuration of a system 1 according to an embodiment of the present disclosure will be described with reference to FIG. 10. FIG. 10 is an explanatory diagram illustrating an example of a schematic configuration of the system 1 according to an embodiment of the present disclosure. Referring to FIG. 10, the system 1 includes a base station 100 and a terminal device 200.

(1) Base Station 100

The base station 100 is a base station of a mobile communication system (or a cellular system). The base station 100 performs radio communication with terminal devices (e.g., the terminal device 200) positioned within a cell 101. The base station 100, for example, transmits downlink signals to terminal devices and receives uplink signals from terminal devices.

(2) Terminal Device 200

The terminal device 200 is a terminal device that can communicate in the mobile communication system (or cellular system). The terminal device 200 performs radio communication with base stations (e.g., the base station 100). The terminal device 200, for example, receives downlink signals from base stations and transmits uplink signals from base stations.

(3) Non-Orthogonal Multiplexing Using Codebook

In an embodiment of the present disclosure, in particular, non-orthogonal multiplexing/non-orthogonal multiple access using a codebook is performed.

The codebook is, for example, a codebook of sparse codes (SCs). The non-orthogonal multiple access using the codebook is SCMA, and the non-orthogonal multiplexing using the codebook is multiplexing in SCMA.

In a first embodiment to be described below, non-orthogonal multiplexing/non-orthogonal multiple access using a codebook is performed in downlink. On the other hand, in a second embodiment to be described below, non-orthogonal multiplexing/non-orthogonal multiple access using a codebook is performed in uplink.

3. First Embodiment

Next, the first embodiment of the present disclosure will be described with reference to FIGS. 11 to 21. In the first embodiment, non-orthogonal multiplexing/non-orthogonal multiple access using a codebook is performed in downlink.

<3.1. Configuration of Base Station>

Figure 11:
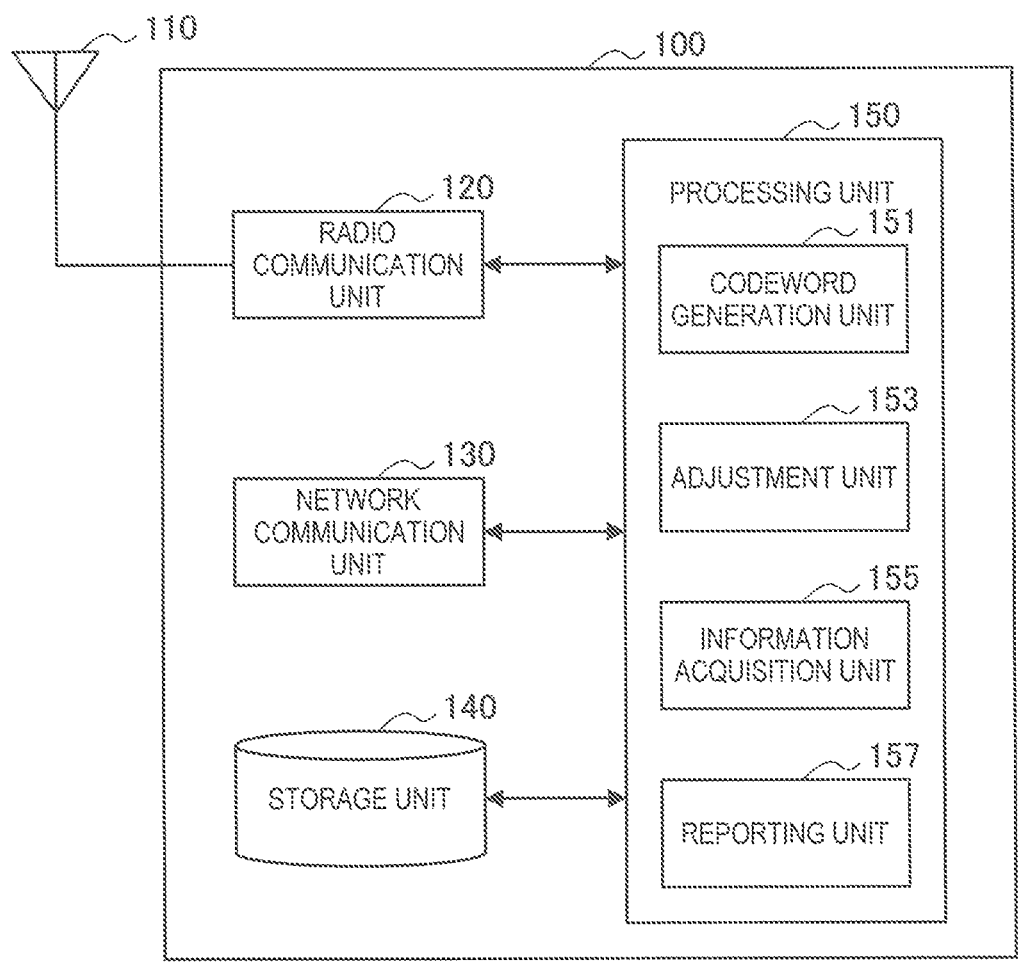
FIG. 11 is a block diagram illustrating an example of a configuration of a base station according to a first embodiment.

First, an example of a configuration of the base station 100 according to the first embodiment will be described with reference to FIG. 11. FIG. 11 is a block diagram illustrating the example of the configuration of the base station 100 according to the first embodiment. According to FIG. 11, the base station 100 includes an antenna unit 110, a radio communication unit 120, a network communication unit 130, a storage unit 140, and a processing unit 150.

(1) Antenna Unit 110

The antenna unit 110 radiates signals output by the radio communication unit 120 out into space as radio waves. In addition, the antenna unit 110 converts radio waves in the space into signals, and outputs the signals to the radio communication unit 120.

(2) Radio Communication Unit 120

The radio communication unit 120 transmits and receives signals. For example, the radio communication unit 120 transmits a downlink signal to a terminal device, and receives an uplink signal from a terminal device.

(3) Network Communication Unit 130

The network communication unit 130 transmits and receives information. For example, the network communication unit 130 transmits information to other nodes, and receives information from other nodes. For example, the other nodes include another base station and a core network node.

(4) Storage Unit 140

The storage unit 140 temporarily or permanently stores a program and various data for operation of the base station 100.

(5) Processing Unit 150

The processing unit 150 provides various functions of the base station 100. The processing unit 150 includes a codeword generation unit 151, an adjustment unit 153, an information acquisition unit 155, and a reporting unit 157. Note that the processing unit 150 may further include a structural element other than these structural elements. That is, the processing unit 150 may perform operation other than the operation of these structural elements.

The codeword generation unit 151, the adjustment unit 153, the information acquisition unit 155, and the reporting unit 157 will be described below in detail.

<3.2. Configuration of Terminal Device>

Figure 12:
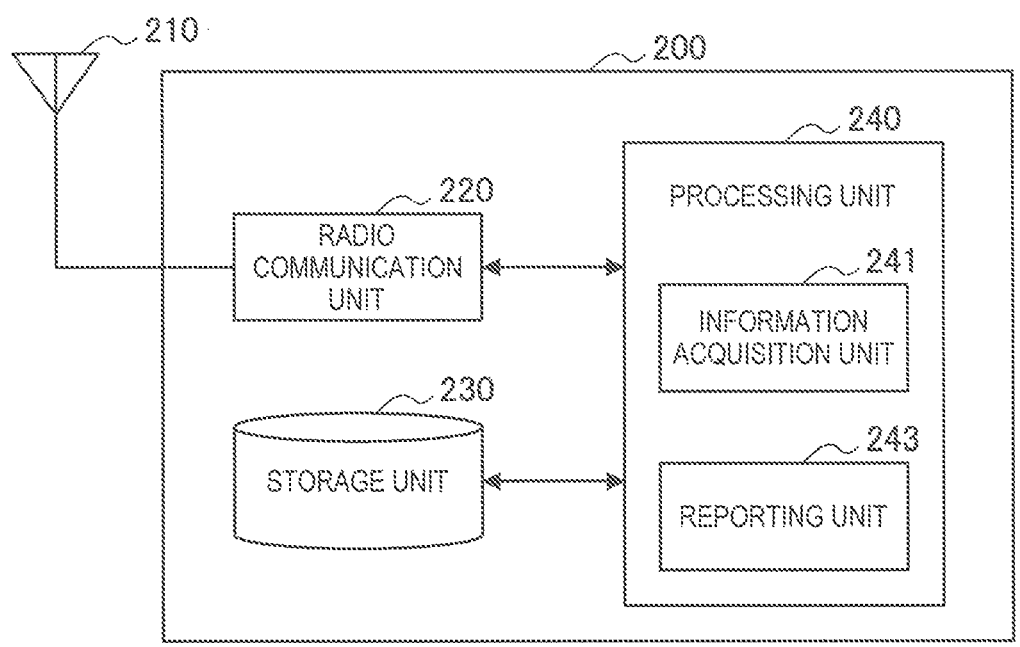
FIG. 12 is a block diagram illustrating an example of a configuration of a terminal device according to the first embodiment.

Next, an example of a configuration of the terminal device 200 according to the first embodiment will be described with reference to FIG. 12. FIG. 12 is a block diagram illustrating the example of the configuration of the terminal device 200 according to the first embodiment. According to FIG. 12, the terminal device 200 includes an antenna unit 210, a radio communication unit 220, a storage unit 230, and a processing unit 240.

(1) Antenna Unit 210

The antenna unit 210 radiates signals output by the radio communication unit 220 out into space as radio waves. In addition, the antenna unit 210 converts radio waves in the space into signals, and outputs the signals to the radio communication unit 220.

(2) Radio Communication Unit 220

The radio communication unit 220 transmits and receives signals. For example, the radio communication unit 220 receives a downlink signal from a base station, and transmits an uplink signal to a base station.

(3) Storage Unit 230

The storage unit 230 temporarily or permanently stores a program and various data for operation of the terminal device 200.

(4) Processing Unit 240

The processing unit 240 provides various functions of the terminal device 200. The processing unit 240 includes an information acquisition unit 241 and a control unit 243. Note that the processing unit 240 may further include a structural element other than these structural elements. That is, the processing unit 240 may perform operation other than the operation of these structural elements.

The information acquisition unit 241 and the control unit 243 will be described below in detail.

<3.3. Technical Features>

Next, technical features according to the first embodiment will be described with reference to FIGS. 13 to 18.

(1) Generation of Codewords

The base station 100 (the codeword generation unit 151) generates, for each of a plurality of layers that is subject to non-orthogonal multiplexing using a codebook, codewords of the layers from data of the layers on the basis of the codebook for the layers.

(a) Non-Orthogonal Multiplexing Using Codebook

As described above, the codebook is, for example, a codebook of sparse codes (SCs), and the non-orthogonal multiplexing using the codebook is multiplexing in SCMA.

(b) Codebook

The codebook is, for example, information indicating correspondences between data candidates and codewords. As an example, the codebook is the codebook illustrated in FIG. 3.

(c) Generation of Codewords

The base station 100 (the codeword generation unit 151) generates, for example, codewords corresponding to the data of the codebook. In other words, the base station 100 (the codeword generation unit 151) converts the data into codewords corresponding to the data of the codebook.

(2) Adjustment of Radio Resources

The base station 100 (the adjustment unit 153) adjusts radio resources to be used in transmission of signal elements included in a multiplexed codeword obtained by multiplexing of the codewords of the plurality of layers.

Accordingly, for example, communication can be performed more favorably when non-orthogonal multiplexing using the codebook is used. More specifically, for example, concentration of influence of fading on a specific layer is avoided without changing the codebook, and thus deterioration of communication quality of the specific layer is suppressed.

(a) Radio Resources (a-1) Frequency Resources

The radio resources are, for example, frequency resources. That is, the base station 100 (the adjustment unit 153) adjusts frequency resources to be used in transmission of the signal elements included in the multiplexed codewords.

More specifically, the frequency resources are, for example, subcarriers. That is, the base station 100 (the adjustment unit 153) adjusts subcarriers to be used in transmitting the signal elements included in the multiplexed codewords. As an example, the subcarriers are carriers disposed at intervals of 12 kHz.

Accordingly, influence of fading on a specific frequency, for example, can be suppressed.

(a-2) Time Resources

The radio resources are, for example, time resources. That is, the base station 100 (the adjustment unit 153) adjusts time resources to be used in transmission of the signal elements included in the multiplexed codewords.

More specifically, the time resources are, for example, symbols, slots, subframes, or radio frames. That is, the base station 100 (the adjustment unit 153) adjusts symbols, slots, subframes, or radio frames to be used in transmission of the signal elements included in the multiplexed codewords.

Accordingly, influence of fading on a specific time, for example, can be suppressed.

(b) Multiplexing and Multiplexed Codewords (b-1) Example of Multiplexing

The multiplexing of the codewords of the plurality of layers is, for example, addition of the codewords of the plurality of layers. The multiplexed codeword is obtained by the addition.

More specifically, each of the codewords is, for example, a vector including a complex number as a signal element, and the multiplexing is addition of the codewords that are vectors. The multiplexed codeword is a vector obtained by the addition.

(b-2) Timing of Multiplexing

The base station 100 performs, for example, the multiplexing of the codewords of the plurality of layers first, and then maps each of signal elements included in the multiplexed codeword to a corresponding radio resource.

Alternatively, the base station 100 may first map each of signal elements (e.g., signal elements that are not 0) included in the codewords of each of the plurality of layers to a corresponding radio resource. Then, the base station 100 may multiplex (for example, performs addition of) signal elements mapped to the same radio resources, thereby performing the multiplexing of the codewords of the plurality of layers.

(c) Example of Adjustment (Exchange of Radio Resources Between Signal Elements)

The adjustment includes, for example, exchange of radio resources to be used in transmission between at least two signal elements included in one or more multiplexed codewords each generated from codewords of a plurality of layers.

Accordingly, it is possible to, for example, disperse influence of fading among layers. As a result, concentration of the influence on a specific layer, for example, is avoided.

(c-1) Signal Element

Signal Elements Included in Two or More Multiplexed Codewords

The one or more multiplexed codewords are, for example, two or more multiplexed codewords. That is, the base station 100 (the adjustment unit 153) exchanges radio resources to be used in transmission between at least two signal elements included in two or more multiplexed codewords.

Accordingly, it is possible to, for example, disperse influence of fading among the multiplexed codewords. As a result, concentration of the influence on a specific multiplexed codeword, for example, is avoided.

Signal Elements Included in Single Multiplexed Codeword

The one or more multiplexed codewords may be a single multiplexed codeword. That is, the base station 100 (the adjustment unit 153) may exchange radio resources to be used in transmission between at least two signal elements included in a single multiplexed codeword.

Accordingly, it is possible to, for example, disperse influence of fading within the multiplexed codeword. As a result, concentration of the influence on a specific layer in the multiplexed codeword, for example, is avoided.

(c-2) Specific Example of Exchange

First Example

The adjustment includes, for example, exchange of radio resources to be used in transmission between pairs of signal elements included in the one or more multiplexed codewords. A specific example will be described below with reference to FIGS. 13 and 14.

Figure 13:
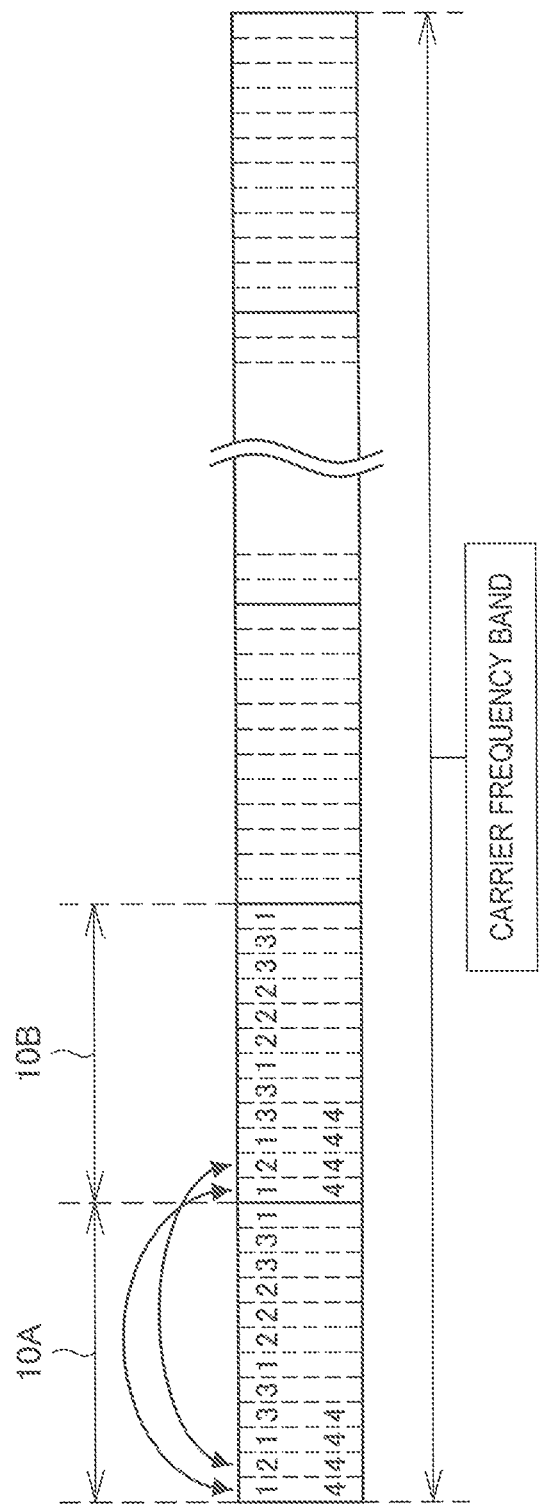
FIG. 13 is an explanatory diagram for describing a first example of exchange of radio resources between signal elements.

FIG. 13 is an explanatory diagram for describing a first example of exchange of radio resources between signal elements. Referring to FIG. 13, a carrier frequency band is shown. The carrier frequency band includes a plurality of blocks 10 each including 12 subcarriers. In general, multiplexed codewords are transmitted as shown in, for example, FIG. 8. In this example, however, radio resources to be used in transmission are exchanged between signal elements included in a $1^{st}$ multiplexed codeword that is normally transmitted on a block 10A and signal elements included in a $2^{nd}$ multiplexed codeword that is normally transmitted on a block 10B. The radio resources (subcarriers or resource elements) are exchanged between, for example, the $1^{st}$ signal elements of the multiplexed codewords. In addition, the radio resources are also exchanged between the $2^{nd}$ signal elements of the multiplexed codewords.

Figure 14:
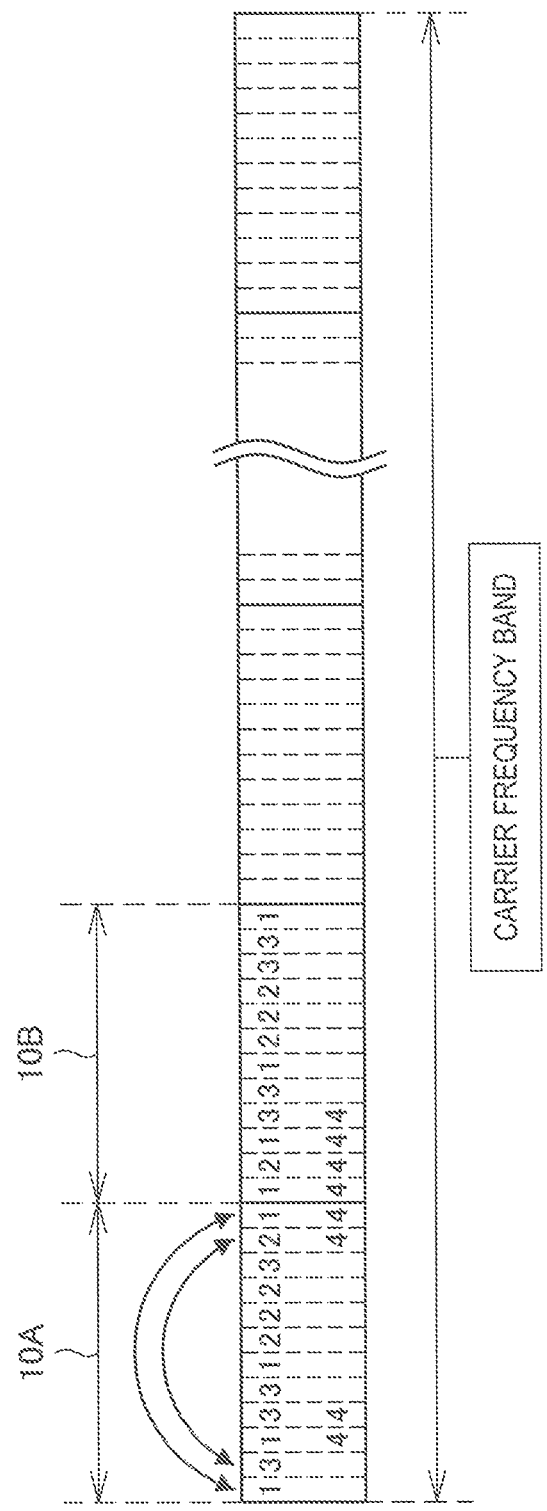
FIG. 14 is an explanatory diagram for describing a second example of exchange of radio resources between signal elements.

FIG. 14 is an explanatory diagram for describing a second example of exchange of radio resources between signal elements. Referring to FIG. 14, a carrier frequency band is shown. The carrier frequency band includes a plurality of blocks 10 each including 12 subcarriers. In general, multiplexed codewords are transmitted as shown in, for example, FIG. 8. In this example, however, radio resources to be used in transmission are exchanged between two signal elements included in a $1^{st}$ multiplexed codeword that is transmitted on a block 10A. The radio resources (subcarriers or resource elements) are exchanged between a $1^{st}$ signal element and a $12^{th}$ signal element included in the $1^{st}$ codeword. In addition, the radio resources are exchanged between a $2^{nd}$ signal element and an $11^{th}$ signal element included in the $1^{st}$ codeword.

Second Example (Cyclic Shift)

The adjustment may include exchange of the radio resources to be used in transmission between the at least two signal elements through a cyclic shift. A specific example will be described below with reference to FIG. 15.

Figure 15:
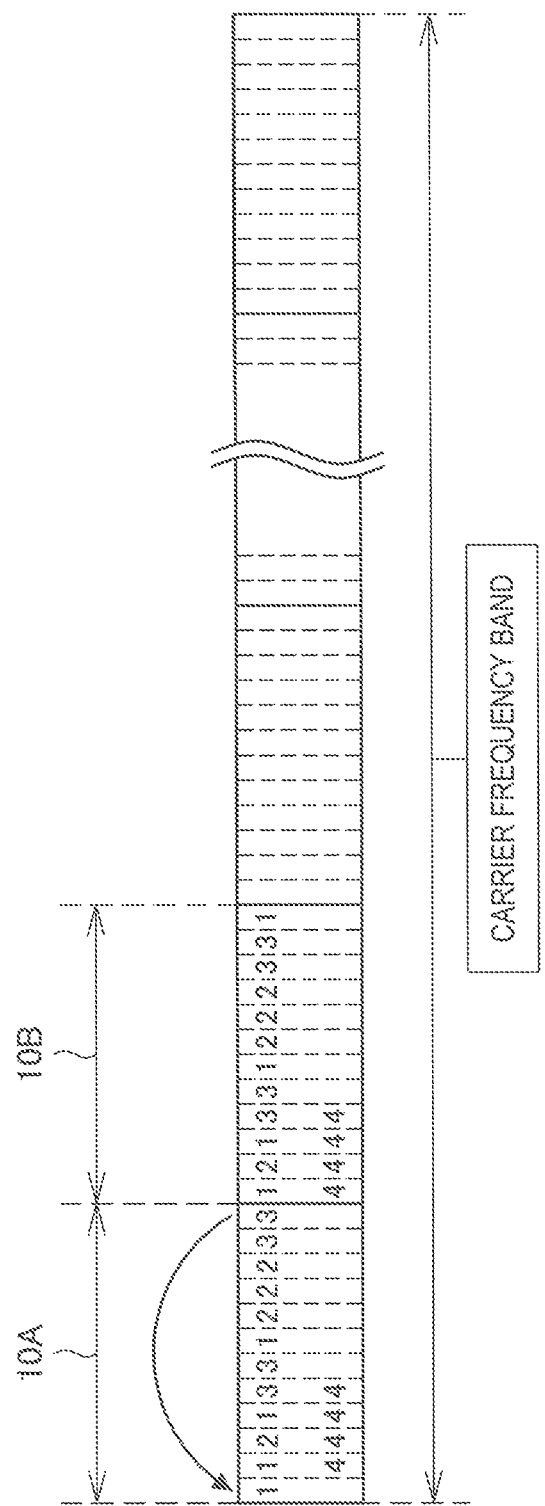
FIG. 15 is an explanatory diagram for describing a third example of exchange of radio resources between signal elements.

FIG. 15 is an explanatory diagram for describing a third example of exchange of radio resources between signal elements. Referring to FIG. 15, a carrier frequency band is shown. The carrier frequency band includes a plurality of blocks 10 each including 12 subcarriers. In general, multiplexed codewords are transmitted as shown in, for example, FIG. 8. In this example, however, radio resources to be used in transmission are exchanged among 12 signal elements included in a $1^{st}$ multiplexed codeword transmitted on a block 10A through a cyclic shift. For example, a $1^{st}$ signal element included in the $1^{st}$ multiplexed codeword is transmitted on a $2^{nd}$ subcarrier of the block 10A. Likewise, a $2^{nd}$ signal element included in the $1^{st}$ multiplexed codeword is transmitted on a $3^{rd}$ subcarrier of the block 10A, and a $12^{th}$ signal element included in the $1^{st}$ multiplexed codeword is transmitted on a $1^{st}$ subcarrier of the block 10A.

A cyclic shift may of course be performed continuously in a time direction. For example, the $1^{st}$ signal element included in the $1^{st}$ multiplexed codeword may be transmitted on the $3^{rd}$ subcarrier of the block 10A after an elapse of time. Likewise, the $2^{nd}$ signal element included in the $1^{st}$ multiplexed codeword is transmitted on a $4^{th}$ subcarrier of the block 10A, and the $12^{th}$ signal element included in the $1^{st}$ multiplexed codeword is transmitted on the $2^{nd}$ subcarrier of the block 10A.

In addition, a cyclic shift may be a shift by two or more radio resources (e.g., two or more subcarriers) each, rather than a shift by one radio resource (e.g., one subcarrier) each.

Note that, although the example in which the radio resources are exchanged between the signal elements included in a single multiplexed code through a cyclic shift has been described with reference to FIG. 15, radio resources may of course be exchanged between signal elements included in two or more multiplexed codewords through a cyclic shift.

Accordingly, influence of fading can be dispersed among layers, for example, substantially equally.

Third Example (Interleaving)

The adjustment may include exchange of the radio resources to be used in transmission between the at least two signal elements in accordance with an interleaving pattern. A specific example will be described below with reference to FIG. 16.

Figure 16:
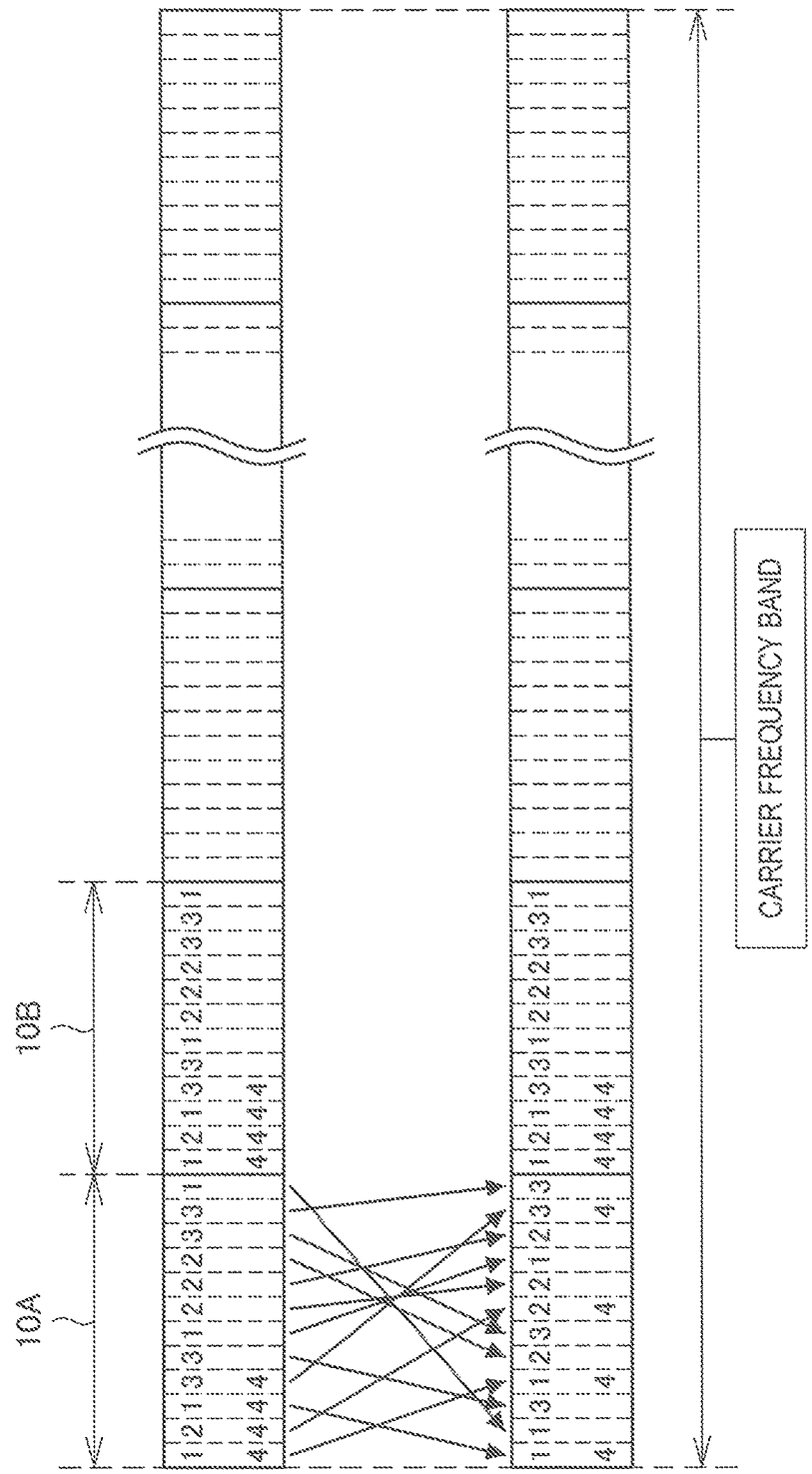
FIG. 16 is an explanatory diagram for describing a third example of exchange of radio resources between signal elements.

FIG. 16 is an explanatory diagram for describing a third example of exchange of radio resources between signal elements. Referring to FIG. 16, carrier frequency bands are shown. The carrier frequency bands include a plurality of blocks 10 each including 12 subcarriers. In general, multiplexed codewords are transmitted as shown in, for example, FIG. 8. In this example, however, radio resources to be used in transmission are exchanged between 12 signal elements included in a $1^{st}$ multiplexed codeword transmitted on a block 10A in accordance with an interleaving pattern. A $1^{st}$ signal element included in the $1^{st}$ multiplexed code is transmitted on, for example, a $4^{th}$ subcarrier of the block 10A. A $2^{nd}$ signal element included in the $1^{st}$ multiplexing codeword is transmitted on a $7^{th}$ subcarrier of the block 10A.

The interleaving pattern may be an interleaving pattern decided on by the base station 100 (or another node) (on the basis of, for example, a state of channels). Alternatively, the interleaving pattern may be a predetermined interleaving pattern.

The base station 100 (the reporting unit 157) may report the interleaving pattern to the terminal device 200. Accordingly, the terminal device 200 can, for example, ascertain the interleaving pattern.

Note that, although the example in which radio resources are exchanged between signal elements included in a single multiplexed codeword in accordance with an interleaving pattern has been described with reference to FIG. 16, radio resources may of course be exchanged between signal elements included in two or more multiplexed codewords in accordance with an interleaving pattern.

Accordingly, influence of fading can be, for example, flexibly dispersed.

(d) Other Examples of Adjustment

As described above, the adjustment includes, for example, exchange of radio resources to be used in transmission between the two signal elements included in the one or more multiplexed codewords. The adjustment, however, is not limited to such exchange.

As an example, the adjustment may include exchange of radio resources to be used in transmission between signal elements included in multiplexed codes and other signal elements that are not signal elements included in multiplexed codewords.

As another example, the adjustment may include change of radio resources to be used in transmission of signal elements included in multiplexed codes into empty radio resources (e.g., subcarriers or resource elements).

(e) Specific Operation (e-1) First Example

Figure 17:
FIG. 17 is an explanatory diagram for describing a first example of an operation of the base station according to the first embodiment.

FIG. 17 is an explanatory diagram for describing a first example of an operation of the base station 100 according to the first embodiment.

The base station 100 (the processing unit 150) performs error correction encoding for each of a plurality of layers. Furthermore, the base station 100 (the codeword generation unit 151) generates a codeword from data (binary data) that has undergone the error correction encoding.

In addition, the base station 100 (the adjustment unit 153) adjusts radio resources to be used in transmission of signal elements included in multiplexed codes obtained by multiplexing of codewords of the plurality of layers. The base station 100 (the adjustment unit 153) changes, for example, mapping destinations of the signal elements for resource mapping.

Then, the base station 100 (the processing unit 150) performs resource mapping on the basis of the result of the adjustment. That is, the base station 100 (the processing unit 150) maps each of the signal elements to a corresponding radio resource on the basis of the result of the adjustment. Then, the base station 100 (the processing unit 150 and the radio communication unit 120) transmits multiplexed codewords.

(e-2) Second Example

Figure 18:
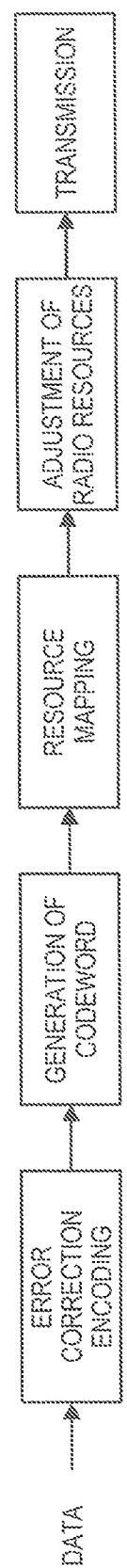
FIG. 18 is an explanatory diagram for describing a second example of an operation of the base station according to the first embodiment.

FIG. 18 is an explanatory diagram for describing a second example of an operation of the base station 100 according to the first embodiment.

The base station 100 (the processing unit 150) performs, for example, error correction encoding for each of a plurality of layers. Furthermore, the base station 100 (the codeword generation unit 151) generates a codeword from data (binary data) that has undergone the error correction encoding.

Then, base station 100 (the processing unit 150) may perform resource mapping. That is, the base station 100 (the processing unit 150) may map each signal element to a corresponding radio resource.

Then, the base station 100 (the adjustment unit 153) may adjust radio resources to be used in transmission of the signal elements included in multiplexed codewords obtained by multiplexing of codewords of the plurality of layers. The base station 100 (the adjustment unit 153) may map, for example, a signal element already mapped to a radio resource to another radio resource again.

Then, the base station 100 (the processing unit 150 and the radio communication unit 120) transmits multiplexed codewords.

(e-3) Timing of Multiplexing

As described above, the base station 100 may first perform, for example, multiplexing of codewords of the plurality of layers. Then, the base station 100 maps each signal element included in the multiplexed codeword to a corresponding radio resource.

Alternatively, the base station 100 may map each signal element (e.g., each signal element that is not 0) included in codewords of the plurality of layers to a corresponding radio resource as described above. Then, the base station 100 may perform multiplexing on signal elements (signal elements of different layers) mapped to the same radio resources, thereby achieving the multiplexing of the codewords of the plurality of layers.

(f) Dynamic Adjustment

The base station 100 (the adjustment unit 153) dynamically or semi-statically performs the adjustment in a time direction.

As a first example, the base station 100 (the adjustment unit 153) performs the adjustment at a predetermined cycle. The base station 100 (the adjustment unit 153) performs the adjustment, for example, at a cycle of a symbol, a slot, a subframe, or a radio frame.

As a second example, the base station 100 (adjustment unit 153) performs the adjustment on the basis of a channel characteristic. The base station 100 (the adjustment unit 153) performs the adjustment, for example, in accordance with degradation of a channel characteristic (e.g., degradation of a characteristic of some subcarriers). Accordingly, for example, the adjustment is performed as necessary, and deterioration of communication quality is suppressed. Note that the channel characteristic is, for example, measured by the terminal device 200 and reported to the base station 100.

As a third example, the base station 100 (the adjustment unit 153) may perform the adjustment when the number of layers included in the plurality of layers exceeds a predetermined number. Accordingly, the adjustment is performed when, for example, inter-layer interference increases, and thus deterioration of communication quality is suppressed.

As a fourth example, the base station 100 (the adjustment unit 153) may perform the adjustment when a predetermined combination of codewords is included in the plurality of codewords. The base station 100 (the adjustment unit 153) may perform adjustment in accordance with the predetermined combination when the predetermined combination is included in the plurality of codewords. The adjustment performed in accordance with the predetermined combination may be exchange of radio resources between signal elements in accordance with a pre-decided pattern for the predetermined combination.

(3) Reporting to Terminal Device

The base station 100 (the information acquisition unit 155) acquires information regarding the adjustment (which will be referred to as "resource adjustment-related information" below). Then, the base station 100 (the reporting unit 157) reports the resource adjustment-related information to the terminal device 200.

(a) Reporting Technique

The base station 100 (the reporting unit 157) reports such resource adjustment-related information included in downlink control information (DCI) to the terminal device 200.

The base station 100 (the reporting unit 157) may report the resource adjustment-related information to the terminal device 200 through an individual signaling to the terminal device 200. The base station 100 (the reporting unit 157) may report such resource adjustment-related information included in system information (SI) to the terminal device 200.

(b) Resource Adjustment-Related Information

The resource-related information includes, for example, information indicating presence or absence of the adjustment. More specifically, the resource-related information includes, for example, information indicating whether or not the adjustment has been performed on radio resources allocated to the terminal device 200.

The resource-related information includes, for example, information indicating a technique of the adjustment. More specifically, the resource-related information includes, for example, information indicating a pattern of exchange of radio resources between signal elements. Note that the pattern may be the above-described interleaving pattern.

(4) Operation of Terminal Device

The terminal device 200 (the information acquisition unit 241) acquires the resource adjustment-related information. Then, the terminal device 200 (the control unit 243) performs a reception process of the terminal device 200 on the basis of the resource adjustment-related information.

The terminal device 200 (the control unit 243) determines, for example, whether the adjustment has been performed from the resource adjustment-related information. Then, when the adjustment has been performed, the terminal device 200 (the control unit 243) takes out multiplexed codewords from received signals in consideration of the adjustment. Then, the terminal device 200 (control unit 243) acquires data of a desired layer through SIC.

When the adjustment has been performed, for example, as illustrated in FIG. 13, the terminal device 200 takes out multiplexed codewords from signal elements of the $1^{st}$ and $2^{nd}$ subcarriers of the block 10B and signal elements of $3^{rd}$ to $12^{th}$ subcarriers of the block 10A. Then, the terminal device 200 (control unit 243) acquires data of a desired layer through SIC.

<3.4. Process Flow>

Next, examples of processes according to the first embodiment will be described with reference to FIGS. 19 to 21.

(1) Process of Base Station (a) First Process

Figure 19:
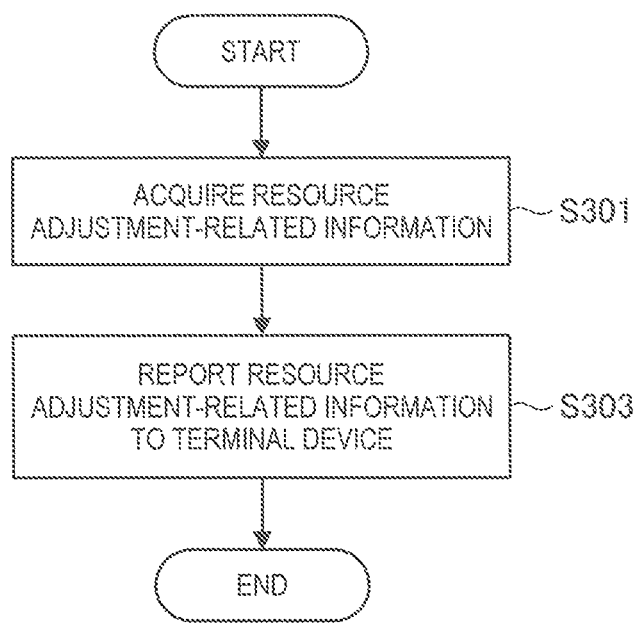
FIG. 19 is a flowchart showing an example of a schematic flow of a first process of the base station according to the first embodiment.

FIG. 19 is a flowchart showing an example of a schematic flow of a first process of the base station 100 according to the first embodiment. The first process is a process relating to reporting of resource adjustment-related information.

The base station 100 (the information acquisition unit 155) acquires resource adjustment-related information (S301). The resource adjustment-related information is information regarding adjustment of radio resources to be used in transmission of signal elements included in multiplexed codewords obtained by multiplexing of codewords of a plurality of layers.

Then, the base station 100 (the reporting unit 157) reports the resource adjustment-related information to the terminal device 200 (S303). Then, the process ends.

(b) Second Process

Figure 20:
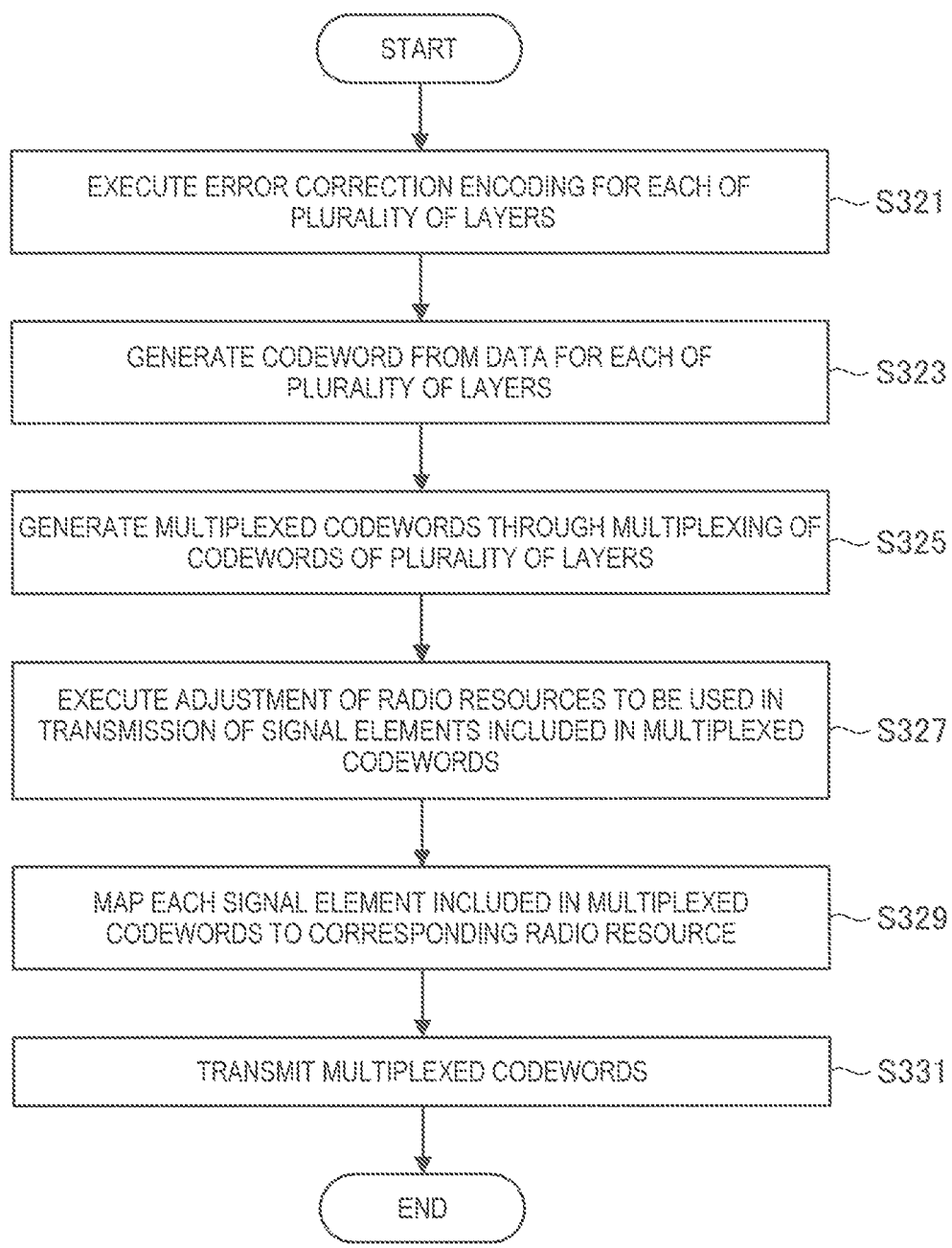
FIG. 20 is a flowchart showing an example of a schematic flow of a second process of the base station according to the first embodiment.

FIG. 20 is a flowchart showing an example of a schematic flow of a second process of the base station 100 according to the first embodiment. The second process is a process relating to data transmission.

The base station 100 (the processing unit 150) performs error correction encoding for each of a plurality of layers (S321).

Next, the base station 100 (the codeword generation unit 151) generates a codeword from data (binary data) that has undergone the error correction encoding for each of the plurality of layers (S323).

Then, the base station 100 (the processing unit 150) generates multiplexed codewords through multiplexing of codewords of the plurality of layers (S325).

Further, the base station 100 (the adjustment unit 153) adjusts radio resources to be used in transmission of signal elements included in the multiplexed codewords (S327). The base station 100 (the adjustment unit 153) changes, for example, mapping destinations of the signal elements for resource mapping.

Thereafter, the base station 100 (the processing unit 150) performs resource mapping on the basis of the result of the adjustment (S329). That is, the base station 100 (the processing unit 150) maps each of the signal elements included in the multiplexed codewords to a corresponding radio resource on the basis of the adjustment.

Then, the base station 100 (the processing unit 150 and the radio communication unit 120) transmits the multiplexed codewords (S331). Then, the process ends.

(3) Process of Terminal Device

Figure 21:
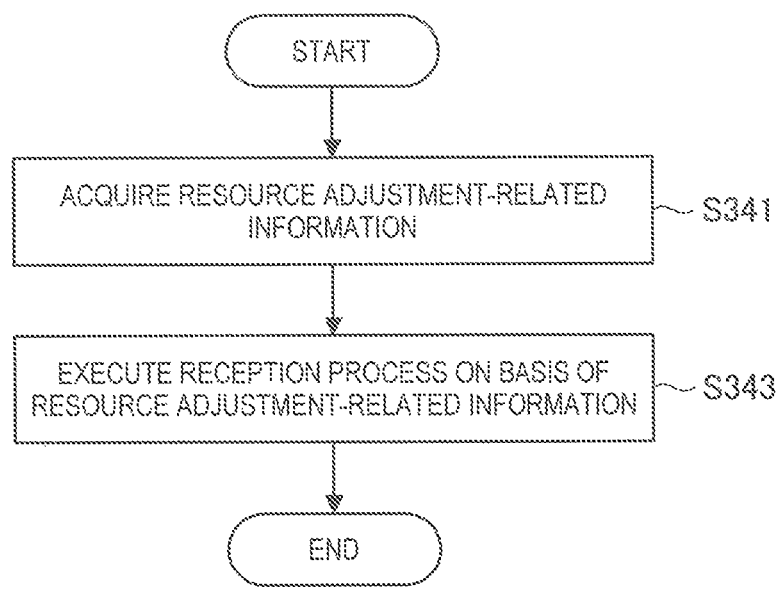
FIG. 21 is a flowchart showing an example of a schematic flow of a process of the terminal device according to the first embodiment.

FIG. 21 is a flowchart showing an example of a schematic flow of a process of the terminal device 200 according to the first embodiment. The process is a process relating to data reception.

The terminal device 200 (the information acquisition unit 241) acquires resource adjustment-related information (S341). The resource adjustment-related information is information regarding adjustment of radio resources to be used in transmission of signal elements included in multiplexed codewords obtained by multiplexing of codewords of a plurality of layers.

Then, the terminal device 200 (the control unit 243) executes a reception process on the basis of the resource adjustment-related information (S343). Then, the process ends.

The first embodiment has been described above. According to the first embodiment, communication can be performed more favorably when, for example, non-orthogonal multiplexing using a codebook is used. More specifically, concentration of influence of fading on a specific layer is avoided without changing the codebook, and thus deterioration of communication quality of the specific layer is suppressed. As a result, chances of re-transmission of data of the specific layer decrease, and an extension of transmission latency and/or a drop in throughput can be suppressed.

Codebooks are generally designed in advance, and thus it is difficult to change a codebook itself in order to avoid concentration of influence of fading. For this reason, radio resources to be used in transmission of each signal element of codewords can be uniquely decided on. As a result, when fading becomes significant on a specific radio resource (e.g., a specific frequency resource), influence thereof on data of a specific layer can increase. Thus, by adjusting radio resources between signal elements as described above, such unique decision on radio resources to be used in transmission of each signal element of codewords can be avoided. Therefore, concentration of influence of fading on the specific layer can be avoided.

4. Second Embodiment

Figure 22:
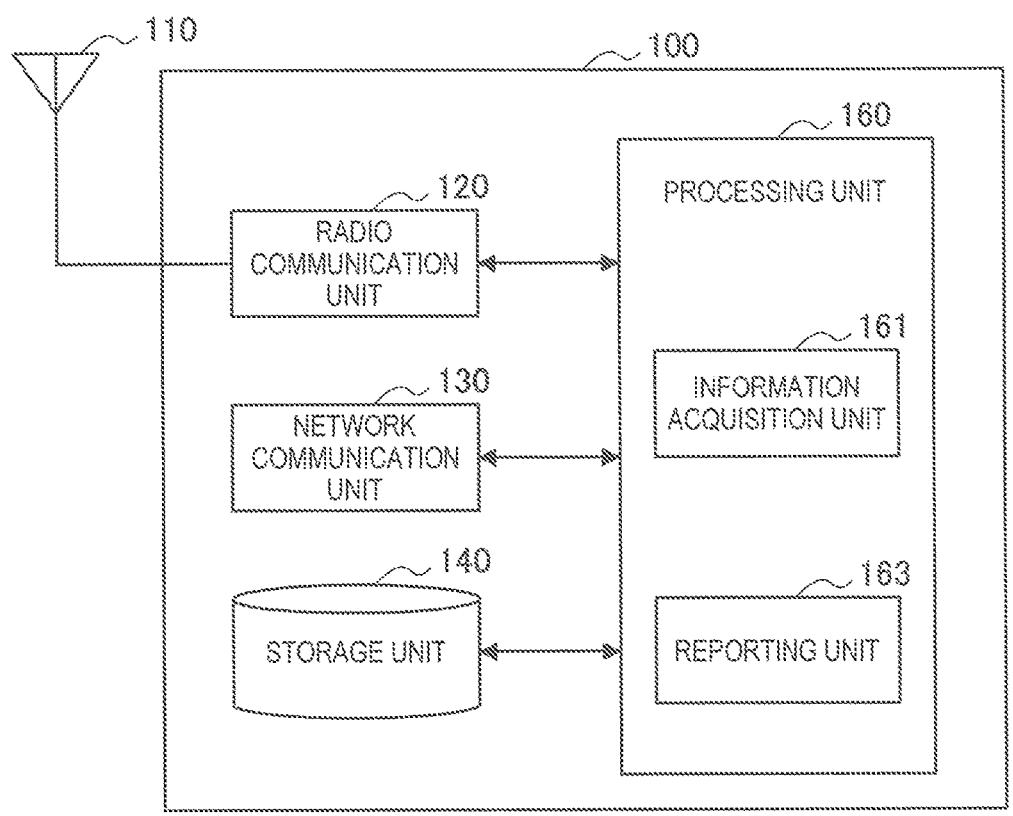
FIG. 22 is a block diagram illustrating an example of a configuration of a base station according to a second embodiment.
Figure 23:
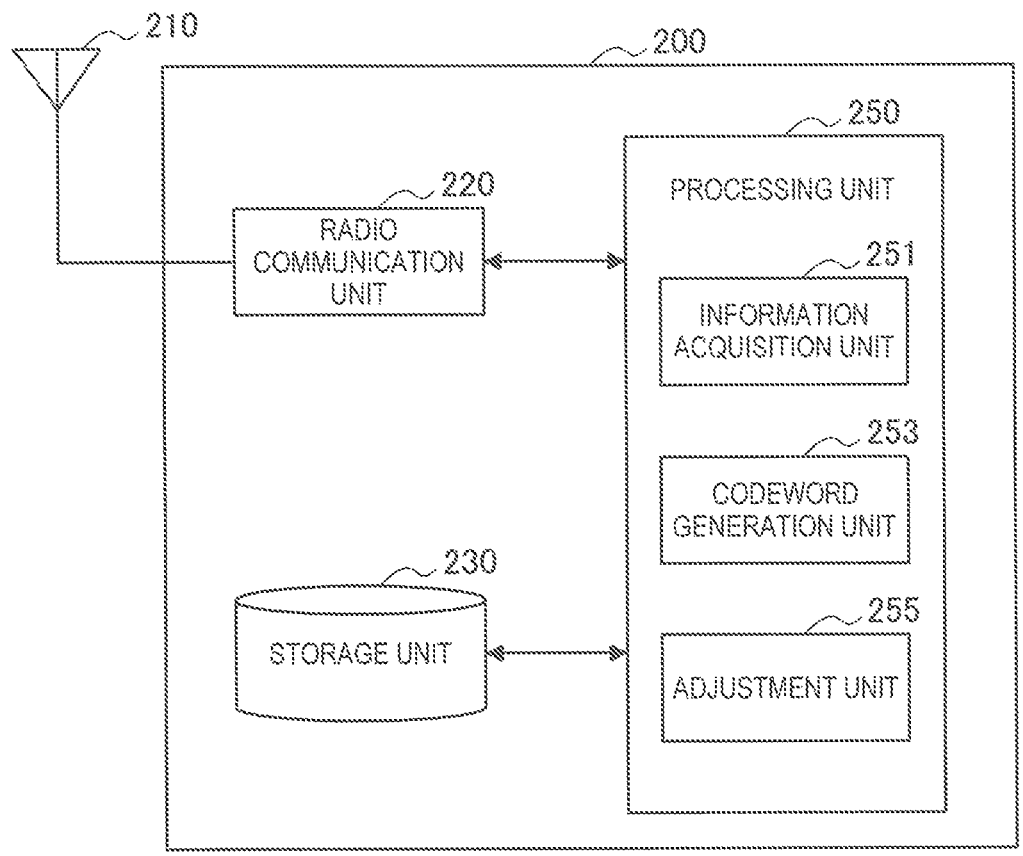
FIG. 23 is a block diagram illustrating an example of a configuration of a terminal device according to the second embodiment.

Next, the second embodiment of the present disclosure will be described with reference to FIGS. 22 to 24. In the second embodiment, non-orthogonal multiplexing/non-orthogonal multiple access using a codebook is performed in uplink.

<4.1. Configuration of Base Station>

First, an example of a configuration of a base station 100 according to the second embodiment will be described with reference to FIG. 22. FIG. 22 is a block diagram illustrating an example of a configuration of the base station 100 according to the second embodiment. Referring to FIG. 22, the base station 100 includes an antenna unit 110, a radio communication unit 120, a network communication unit 130, a storage unit 140, and a processing unit 160.

There is no particular difference in description of the antenna unit 110, the radio communication unit 120, the network communication unit 130, and the storage unit 140 between the first and the second embodiments. Thus, the description is omitted here.

(1) Processing Unit 160

The processing unit 160 provides various functions of the base station 100. The processing unit 160 includes an information acquisition unit 161 and a reporting unit 163. Note that the processing unit 160 may further include other constituent elements in addition to the above constituent elements. That is, the processing unit 160 can perform operations in addition to operations of the above constituent elements.

<4.2. Configuration of Terminal Device>

Next, an example of a configuration of a terminal device 200 according to the second embodiment will be described with reference to FIG. 23. FIG. 23 is a block diagram illustrating an example of a configuration of the terminal device 200 according to the second embodiment. Referring to FIG. 23, the terminal device 200 includes an antenna unit 210, a radio communication unit 220, a storage unit 230, and a processing unit 250.

There is no particular difference in description of the antenna unit 210, the radio communication unit 220, and the storage unit 23 between the first and the second embodiments. Thus, the description is omitted here.

(1) Processing Unit 250

The processing unit 250 provides various functions of the terminal device 200. The processing unit 250 includes an information acquisition unit 251, a codeword generation unit 253, and an adjustment unit 255. Note that the processing unit 250 can further include other constituent elements in addition to the above constituent elements. That is, the processing unit 250 can perform operations in addition to operations of the above constituent elements.

<4.3. Technical Features>

Next, technical features according to the second embodiment will be described.

(1) Generation of Codewords

The terminal device 200 (the codeword generation unit 253) generates codewords of a layer that is subject to non-orthogonal multiplexing using a codebook from data of the layer on the basis of the codebook for the layer. The layer is a layer allocated to the terminal device 200.

A plurality of layers that are subject to non-orthogonal multiplexing using a codebook, for example, are allocated to the terminal device 200. In this case, the terminal device 200 (the codeword generation unit 253) generates, for each of the plurality of layers, a codeword of a layer from data of the layer on the basis of a codebook for a layer.

There is no particular difference in detailed description regarding generation of codewords between the first and the second embodiments except for the difference in the subject (i.e., the subject in the first embodiment is the base station 100, and the subject in the second embodiment is the terminal device 200). Thus, the detailed description thereof is omitted here.

(2) Adjustment of Radio Resources

The terminal device 200 (the adjustment unit 255) adjusts radio resources to be used in transmission of signal elements included in the codewords.

The plurality of layers, for example, are allocated to terminal device 200. In this case, the terminal device 200 (the adjustment unit 255) adjusts radio resources to be used in transmission of signal elements included in multiplexed codewords obtained by multiplexing of codewords of the plurality of layers.

There is no particular difference in detailed description regarding adjustment of radio resources between the first and the second embodiments except for the difference in the subject (i.e., the subject in the first embodiment is the base station 100, and the subject in the second embodiment is the terminal device 200). Thus, the detailed description thereof is omitted here.

Note that, in the second embodiment, the terminal device 200 (the information acquisition unit 251) acquires information regarding the adjustment (i.e., resource adjustment-related information). Then, the terminal device 200 (the adjustment unit 255) performs the adjustment on the basis of the resource adjustment-related information.

(3) Reporting to Terminal Device

The base station 100 (the information acquisition unit 155) acquires the resource adjustment-related information. Then, the base station 100 (reporting unit 157) reports the resource adjustment-related information to the terminal device 200.

There is no particular difference in detailed description regarding reporting of resource adjustment-related information to the terminal device between the first and the second embodiments. Thus, the detailed description thereof is omitted here.

<4.4. Process Flow>

Next, an example of a process according to the second embodiment will be described with reference to FIG. 24.

(1) Process of Base Station

There is no particular difference in the description of the first process of the base station 100 (the description with reference to FIG. 19) between the first and the second embodiments. Thus, the detailed description thereof is omitted here.

(2) Process of Terminal Device

Figure 24:
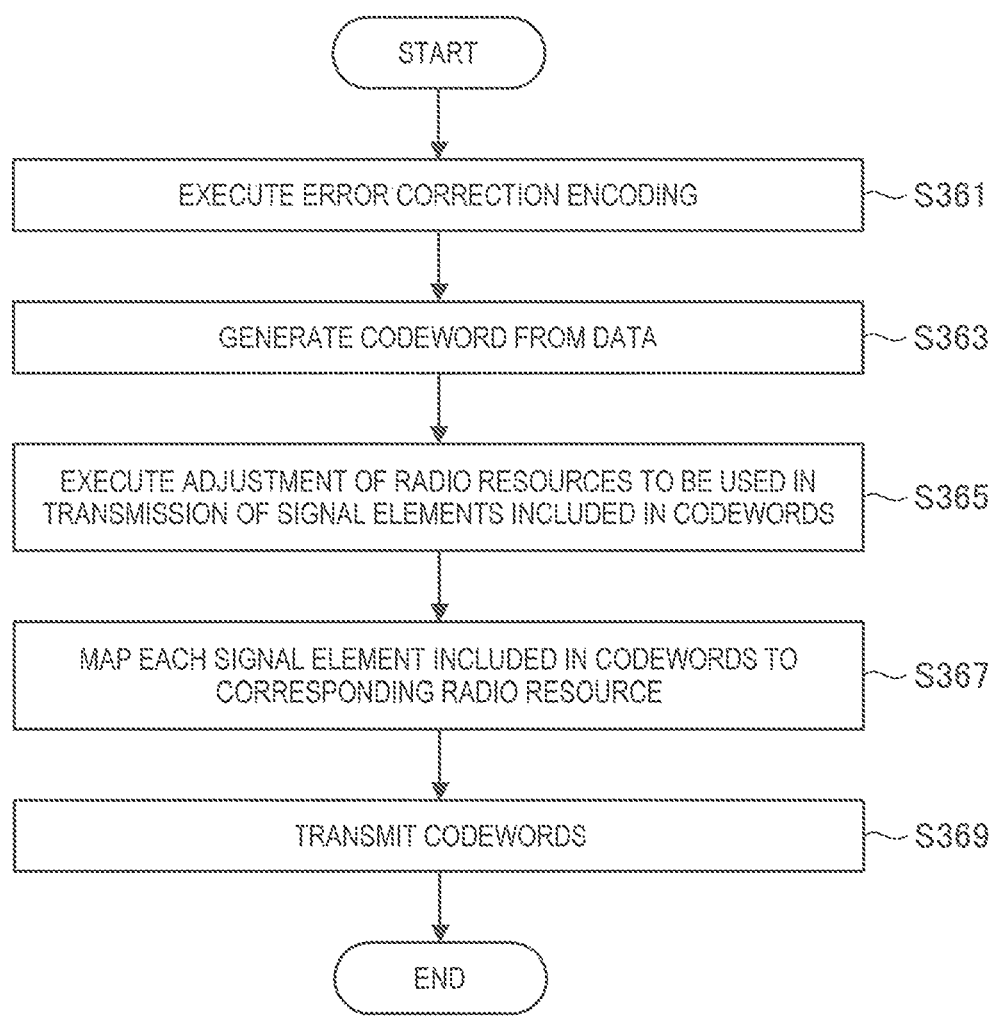
FIG. 24 is a flowchart showing an example of a schematic flow of a process of the terminal device according to the second embodiment.

FIG. 24 is a flowchart showing an example of a schematic flow of a process of the terminal device 200 according to the second embodiment. The process is a process relating to data transmission.

The terminal device 200 (the processing unit 250) performs error correction encoding (S361).

Next, the terminal device 200 (the codeword generation unit 25) generates codewords from data (binary data) that has undergone the error correction encoding (S363).

Then, terminal device 200 (the adjustment unit 255) adjusts radio resources to be used in transmission of signal elements included in the codewords (S365). The terminal device 200 (the adjustment unit 255) changes mapping destinations of the signal elements for resource mapping.

Thereafter, the terminal device 200 (the processing unit 250) performs resource mapping on the basis of the result of the adjustment (S367). That is, the terminal device 200 (the processing unit 250) maps each of the signal elements included in the codewords to a corresponding radio resource on the basis of the result of the adjustment.

Then, the terminal device 200 (the processing unit 250 and the radio communication unit 220) transmits the multiplexed codewords (S369). Then, the process ends.

The second embodiment has been described above. According to the second embodiment, communication can be performed more favorably when, for example, non-orthogonal multiplexing using a codebook is used. More specifically, concentration of influence of fading on a specific layer is avoided without changing a codebook, for example, and thus deterioration of communication quality of the specific layer is suppressed. As a result, chances of re-transmission of data of the specific layer decrease, and an extension of transmission latency and/or a drop in throughput can be suppressed.

5. Application Example

The technology of the present disclosure can be applied to various products. The base station 100 may be realized as any type of evolved node B (eNB), for example, a macro eNB, a small eNB, or the like. A small eNB may be an eNB that covers a smaller cell than a macro cell, such as a pico eNB, a micro eNB, or a home (femto) eNB. Alternatively, the base station 100 may be realized as another type of base station such as a node B or a base transceiver station (BTS). The base station 100 may include a main body that controls radio communication (also referred to as a base station device) and one or more remote radio heads (RRHs) disposed in a different place from the main body. In addition, various types of terminals to be described below may operate as the base station 100 by temporarily or semi-permanently executing the base station function. Furthermore, at least some of constituent elements of the base station 100 may be realized in a base station device or a module for a base station device.

In addition, the terminal device 200 may be realized as, for example, a mobile terminal such as a smartphone, a tablet personal computer (PC), a notebook PC, a portable game terminal, a portable/dongle type mobile router, or a digital camera, or an in-vehicle terminal such as a car navigation device. In addition, the terminal device 200 may be realized as a terminal that performs machine-to-machine (M2M) communication (also referred to as a machine type communication (MTC) terminal). Furthermore, at least some of constituent elements of the terminal device 200 may be realized in a module mounted in such a terminal (for example, an integrated circuit module configured in one die).

<5.1. Application Examples with Respect to Base Station>

(First Application Example)

Figure 25:
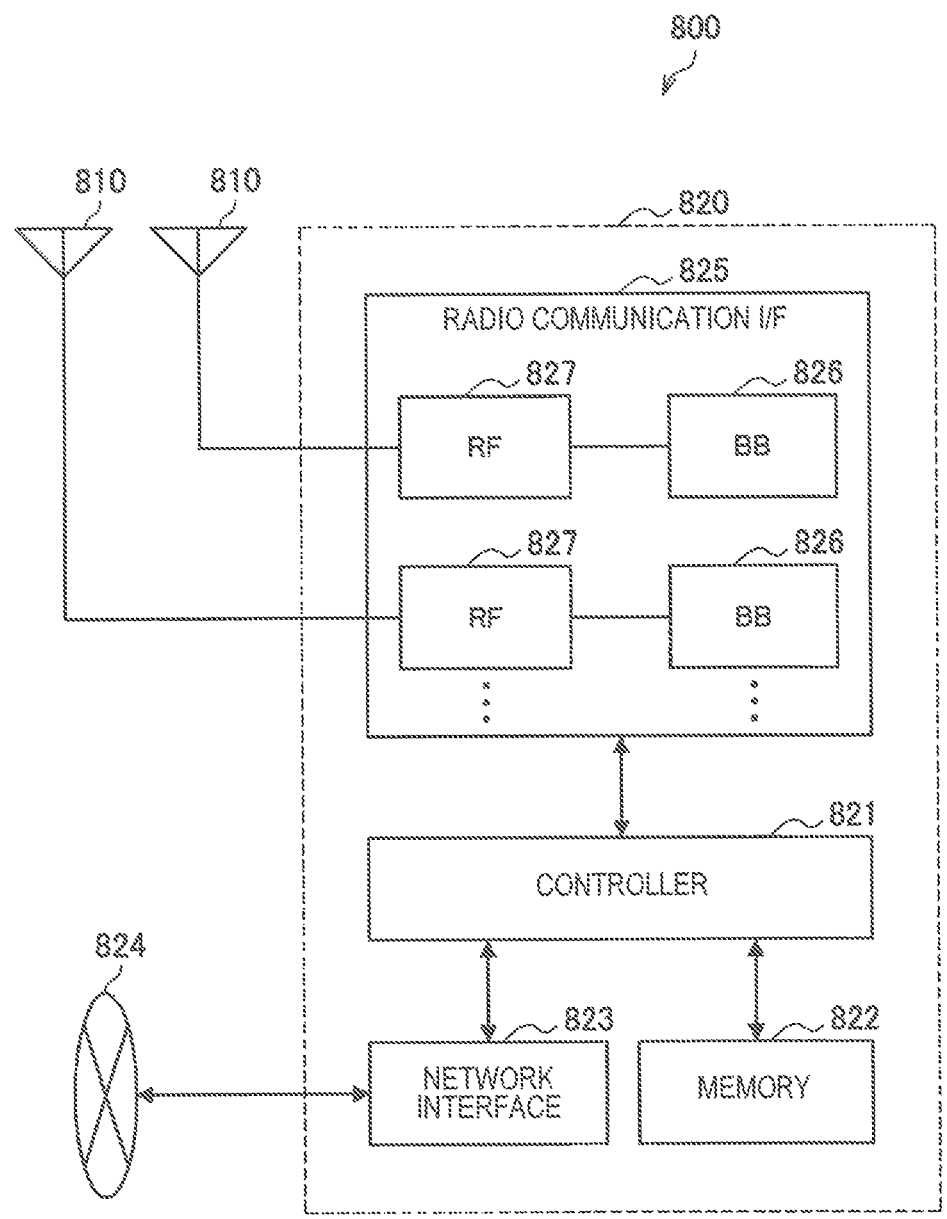
FIG. 25 is a block diagram illustrating a first example of a schematic configuration of an eNB.

FIG. 25 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 25. For example, the multiple antennas 810 may be compatible with multiple frequency bands used by the eNB 800. Although FIG. 25 illustrates the example in which the eNB 800 includes the multiple antennas 810, the eNB 800 may also include a single antenna 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 25. For example, the multiple BB processors 826 may be compatible with multiple frequency bands used by the eNB 800. The radio communication interface 825 may include the multiple RF circuits 827, as illustrated in FIG. 25. For example, the multiple RF circuits 827 may be compatible with multiple antenna elements. Although FIG. 25 illustrates the example in which the radio communication interface 825 includes the multiple BB processors 826 and the multiple RF circuits 827, the radio communication interface 825 may also include a single BB processor 826 or a single RF circuit 827.

In the eNB 800 shown in FIG. 25, one or more structural elements included in the processing unit 150 (the codeword generation unit 151, the adjustment unit 153, the information acquisition unit 155 and/or the reporting unit 157) described with reference to FIG. 11 may be implemented by the radio communication interface 825. Alternatively, at least some of these constituent elements may be implemented by the controller 821. As an example, a module which includes a part (for example, the BB processor 826) or all of the radio communication interface 825 and/or the controller 821 may be mounted in eNB 800, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 800, and the radio communication interface 825 (for example, the BB processor 826) and/or the controller 821 may execute the program. As described above, the eNB 800, the base station device 820, or the module may be provided as a device which includes the one or more structural elements, and the program for causing the processor to function as the one or more structural elements may be provided. In addition, a readable recording medium in which the program is recorded may be provided. These points of the one or more structural elements (the codeword generation unit 151, the adjustment unit 153, the information acquisition unit 155 and/or the reporting unit 157) are likewise applied to the information acquisition unit 161 and/or the reporting unit 163 described with reference to FIG. 22.

In addition, in the eNB 800 shown in FIG. 25, the radio communication unit 120 described with reference to FIG. 11 may be implemented by the radio communication interface 825 (for example, the RF circuit 827). Moreover, the antenna unit 110 may be implemented by the antenna 810. In addition, the network communication unit 130 may be implemented by the controller 821 and/or the network interface 823.

(Second Application Example)

Figure 26:
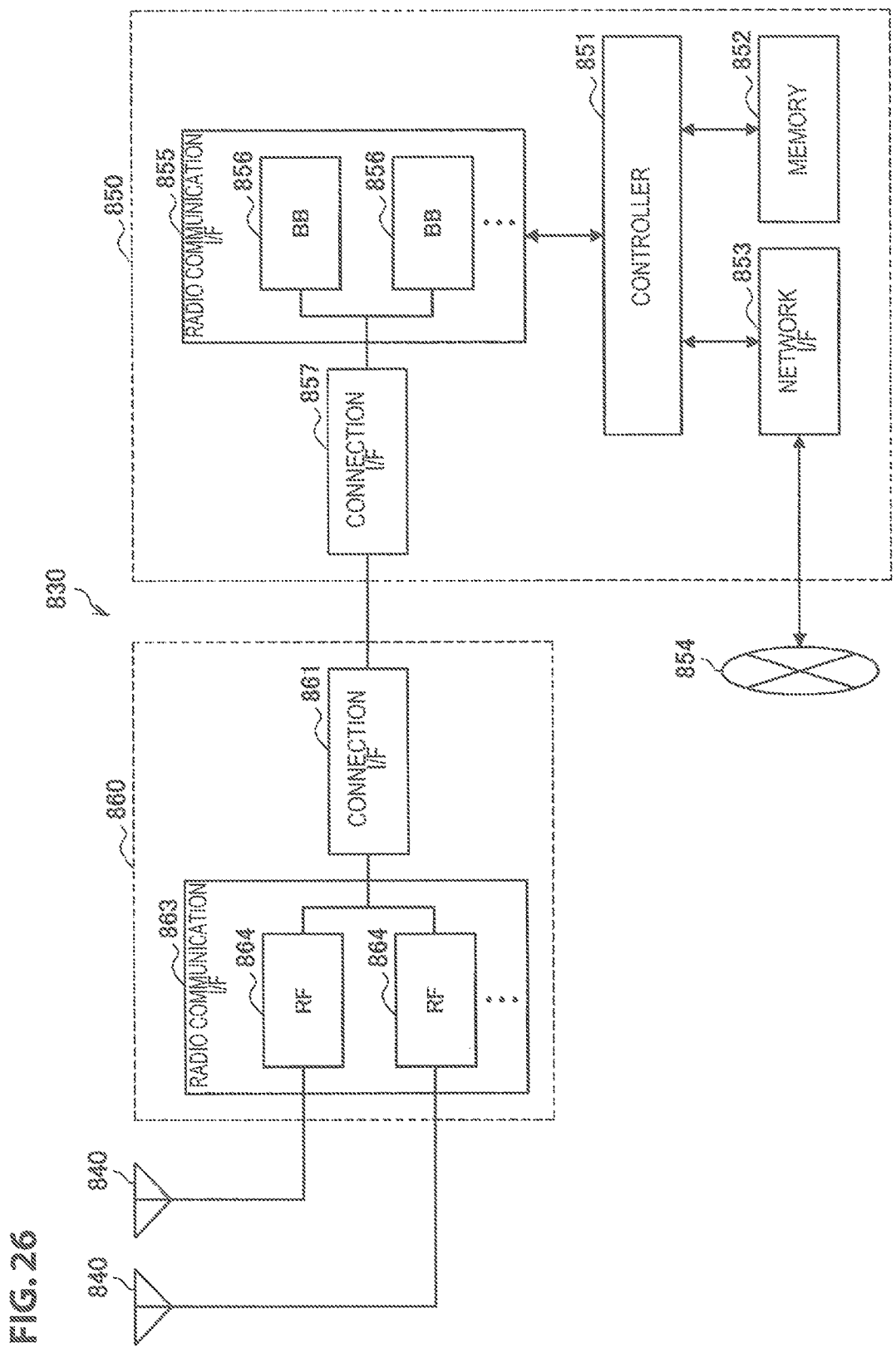
FIG. 26 is a block diagram illustrating a second example of the schematic configuration of the eNB.

FIG. 26 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 26. For example, the multiple antennas 840 may be compatible with multiple frequency bands used by the eNB 830. Although FIG. 26 illustrates the example in which the eNB 830 includes the multiple antennas 840, the eNB 830 may also include a single antenna 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 25.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 25, except the BB processor 856 is connected to the RF circuit 864 of the RRH 860 via the connection interface 857. The radio communication interface 855 may include the multiple BB processors 856, as illustrated in FIG. 29. For example, the multiple BB processors 856 may be compatible with multiple frequency bands used by the eNB 830. Although FIG. 29 illustrates the example in which the radio communication interface 855 includes the multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 26. For example, the multiple RF circuits 864 may support multiple antenna elements. Although FIG. 26 illustrates the example in which the radio communication interface 863 includes the multiple RF circuits 864, the radio communication interface 863 may also include a single RF circuit 864.

In the eNB 830 shown in FIG. 26, one or more structural elements included in the processing unit 150 (the codeword generation unit 151, the adjustment unit 153, the information acquisition unit 155 and/or the reporting unit 157) described with reference to FIG. 11 may be implemented by the radio communication interface 855 and/or the radio communication interface 863. Alternatively, at least some of these constituent elements may be implemented by the controller 851. As an example, a module which includes a part (for example, the BB processor 856) or all of the radio communication interface 855 and/or the controller 851 may be mounted in eNB 830, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 830, and the radio communication interface 855 (for example, the BB processor 856) and/or the controller 851 may execute the program. As described above, the eNB 830, the base station device 850, or the module may be provided as a device which includes the one or more structural elements, and the program for causing the processor to function as the one or more structural elements may be provided. In addition, a readable recording medium in which the program is recorded may be provided. These points of the one or more structural elements (the codeword generation unit 151, the adjustment unit 153, the information acquisition unit 155 and/or the reporting unit 157) are likewise applied to the information acquisition unit 161 and/or the reporting unit 163 described with reference to FIG. 22.

In addition, in the eNB 830 shown in FIG. 26, the radio communication unit 120 described, for example, with reference to FIG. 11 may be implemented by the radio communication interface 863 (for example, the RF circuit 864). Moreover, the antenna unit 110 may be implemented by the antenna 840. In addition, the network communication unit 130 may be implemented by the controller 851 and/or the network interface 853.

<5.2. Application Examples Regarding Terminal Devices>
(First Application Example)

Figure 27:
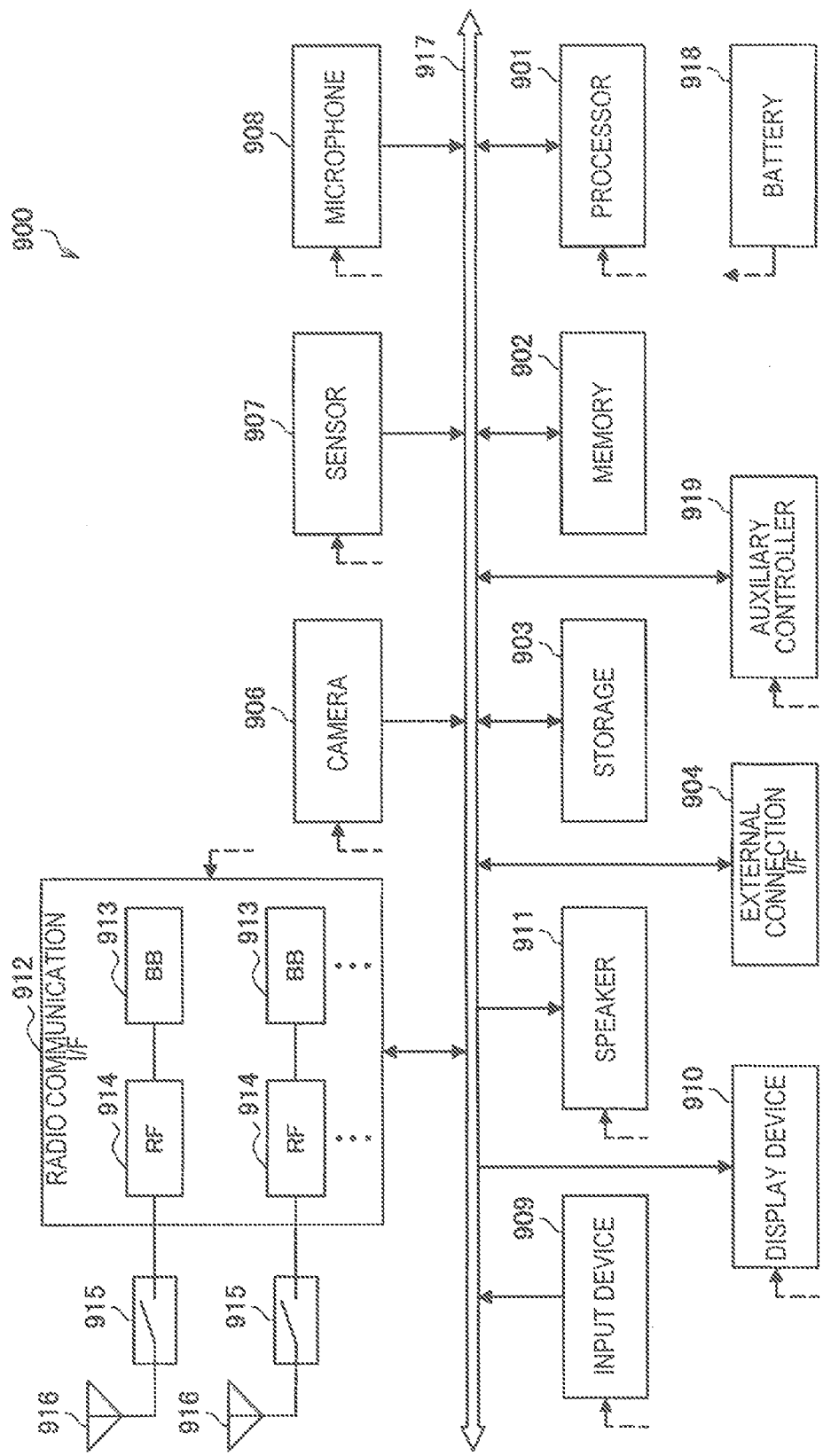
FIG. 27 is a block diagram illustrating an example of a schematic configuration of a smartphone.

FIG. 27 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 913 may also be a one chip module that has the BB processor 913 and the RF circuit 914 integrated thereon. The radio communication interface 912 may include the multiple BB processors 913 and the multiple RF circuits 914, as illustrated in FIG. 27. Although FIG. 27 illustrates the example in which the radio communication interface 913 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 27. Although FIG. 27 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 27 via feeder lines, which are partially shown as dashed lines in the figure. The auxiliary controller 919 operates a minimum necessary function of the smartphone 900, for example, in a sleep mode.

In the smartphone 900 shown in FIG. 27, the information acquisition unit 241 and/or the control unit 243 described with reference to FIG. 12 may be implemented by the radio communication interface 912. Alternatively, at least some of these constituent elements may be implemented by the processor 901 or the auxiliary controller 919. As an example, a module which includes a part (for example, the BB processor 913) or all of the radio communication interface 912, the processor 901 and/or the auxiliary controller 919 may be mounted in the smartphone 900, and the information acquisition unit 241 and/or the control unit 243 may be implemented by the module. In this case, the module may store a program for causing the processor to function as the information acquisition unit 241 and/or the control unit 243 (i.e., a program for causing the processor to execute operations of the information acquisition unit 241 and/or the control unit 243) and may execute the program. As another example, the program for causing the processor to function as the information acquisition unit 241 and/or the control unit 243 may be installed in the smartphone 900, and the radio communication interface 912 (for example, the BB processor 913), the processor 901 and/or the auxiliary controller 919 may execute the program. As described above, the smartphone 900 or the module may be provided as a device which includes the information acquisition unit 241 and/or the control unit 243, and the program for causing the processor to function as the information acquisition unit 241 and/or the control unit 243 may be provided. In addition, a readable recording medium in which the program is recorded may be provided. These points of the information acquisition unit 241 and/or the control unit 243 are likewise applied to one or more structural elements included in the processing unit 250 described with reference to FIG. 23 (the information acquisition unit 251, the codeword generation unit 253, and/or the adjustment unit 255).

In addition, in the smartphone 900 shown in FIG. 27, the radio communication unit 220 described, for example, with reference to FIG. 12 may be implemented by the radio communication interface 912 (for example, the RF circuit 914). Moreover, the antenna unit 210 may be implemented by the antenna 916.

(Second Application Example)

Figure 28:
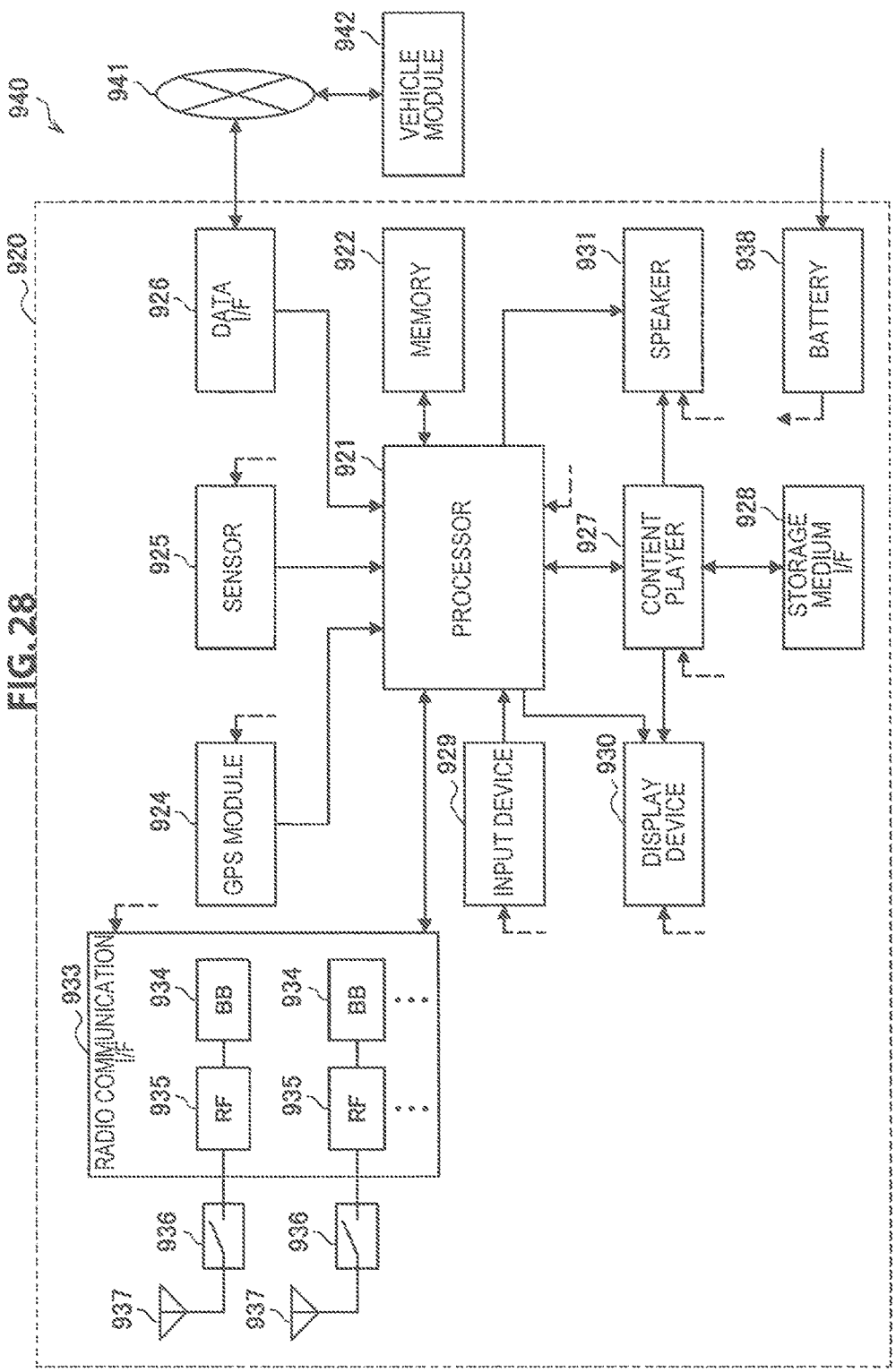
FIG. 28 is a block diagram illustrating an example of a schematic configuration of a car navigation device.

FIG. 28 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 28. Although FIG. 28 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation device 920 may include the multiple antennas 937, as illustrated in FIG. 28. Although FIG. 28 illustrates the example in which the car navigation device 920 includes the multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to blocks of the car navigation device 920 illustrated in FIG. 28 via feeder lines that are partially shown as dashed lines in the figure. The battery 938 accumulates power supplied form the vehicle.

In the car navigation device 920 shown in FIG. 28, the information acquisition unit 241 and/or the control unit 243 described with reference to FIG. 12 may be implemented by the radio communication interface 933. Alternatively, at least some of these constituent elements may be implemented by the processor 921. As an example, a module which includes a part (for example, the BB processor 934) or all of the radio communication interface 933 and/or the controller 921 may be mounted in the car navigation device 920, and the information acquisition unit 241 and/or the control unit 243 may be implemented by the module. In this case, the module may store a program for causing the processor to function as the information acquisition unit 241 and/or the control unit 243 (i.e., a program for causing the processor to execute operations of the information acquisition unit 241 and/or the control unit 243) and may execute the program. As another example, the program for causing the processor to function as the information acquisition unit 241 and/or the control unit 243 may be installed in the car navigation device 920, and the radio communication interface 933 (for example, the BB processor 934) and/or the controller 921 may execute the program. As described above, the car navigation device 920 or the module may be provided as a device which includes the information acquisition unit 241 and/or the control unit 243, and the program for causing the processor to function as the information acquisition unit 241 and/or the control unit 243 may be provided. In addition, a readable recording medium in which the program is recorded may be provided. These points of the information acquisition unit 241 and/or the control unit 243 are likewise applied to one or more structural elements included in the processing unit 250 described with reference to FIG. 23 (the information acquisition unit 251, the codeword generation unit 253, and/or the adjustment unit 255).

In addition, in the car navigation device 920 shown in FIG. 28, the radio communication unit 220 described, for example, with reference to FIG. 12 may be implemented by the radio communication interface 933 (for example, the RF circuit 935). Moreover, the antenna unit 210 may be implemented by the antenna 937.

The technology of the present disclosure may also be realized as an in-vehicle system (or a vehicle) 940 including one or more blocks of the car navigation device 920, the in-vehicle network 941, and a vehicle module 942. In other words, the in-vehicle system (or a vehicle) 940 may be provided as a device which includes the information acquisition unit 241 and/or the control unit 243 (or the information acquisition unit 251, the codeword generation unit 253, and/or the adjustment unit 255). The vehicle module 942 generates vehicle data such as vehicle speed, engine speed, and trouble information, and outputs the generated data to the in-vehicle network 941.

6. Conclusion

So far, devices and processes according to the embodiments of the present disclosure have been described with reference to FIGS. 9 to 28.

According to the first embodiment, the base station 100 includes the codeword generation unit 151 which generates, for each of the plurality of layers that are subject to non-orthogonal multiplexing using a codebook, a codeword of a layer from data of the layer on the basis of a codebook for a layer, and the adjustment unit 153 which adjusts a radio resource to be used in transmission of a signal element included in a multiplexed codeword obtained by multiplexing of codewords of the plurality of layers.

According to the second embodiment, the terminal device 200 includes the codeword generation unit 253 which generates, on the basis of a codebook for a layer that is subject to non-orthogonal multiplexing using a codebook, a codeword of the layer from the data of the layer, and the adjustment unit 255 which adjusts radio resources to be used in transmission of signal elements included in the codeword.

Accordingly, communication can be performed more favorably when, for example, non-orthogonal multiplexing using a codebook is used. More specifically, concentration of influence of fading on a specific layer is avoided without changing a codebook, for example, and thus deterioration of communication quality of the specific layer is suppressed. As a result, chances of re-transmission of data of the specific layer decrease, and an extension of transmission latency and/or a drop in throughput can be suppressed.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Processing steps in processes of the present specification may not necessarily be executed in, for example, a time series manner in the order described in the flowcharts or sequence diagrams. The processing steps in the processes may also be executed in, for example, a different order from the order described in the flowcharts or sequence diagrams, or may be executed in parallel.

In addition, a computer program for causing a processor (for example, a CPU, a DSP, or the like) provided in a device of the present specification (for example, a base station, a base station device or a module for a base station device, or a terminal device or a module for a terminal device) to function as a constituent element of the device (for example, the codeword generation unit, the adjustment unit, the information acquisition unit, the reporting unit, the control unit, and/or the like) (in other words, a computer program for causing the processor to execute operations of the constituent element of the device) can also be created. In addition, a recording medium in which the computer program is recorded may also be provided. Further, a device that includes a memory in which the computer program is stored and one or more processors that can execute the computer program (a base station, a base station device or a module for a base station device, or a terminal device or a module for a terminal device) may also be provided. In addition, a method including an operation of the constituent element of the device (for example, the codeword generation unit, the adjustment unit, the information acquisition unit, the reporting unit, the control unit, and/or the like) is also included in the technology of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A device including:

a generation unit configured to generate, for each of a plurality of layers that are subject to non-orthogonal multiplexing using a codebook, a codeword of a layer from data of the layer on the basis of a codebook for the layer; and an adjustment unit configured to adjust a radio resource to be used in transmission of a signal element included in a multiplexed codeword obtained by multiplexing of codewords of the plurality of layers.

(2)

The device according to (1), wherein the adjustment includes exchange of radio resources to be used in transmission between at least two signal elements included in one or more multiplexed codewords each generated from codewords of a plurality of layers.

(3)

The device according to (2), wherein the one or more multiplexed codewords are two or more multiplexed codewords.

(4)

The device according to (2), wherein the one or more multiplexed codewords are a single multiplexed codeword.

(5)

The device according to any one of (2) to (4), wherein the adjustment includes exchange of the radio resources to be used in transmission between the at least two signal elements through a cyclic shift.

(6)

The device according to any one of (2) to (5), wherein the adjustment includes exchange of the radio resources to be used in transmission between the at least two signal elements in accordance with an interleaving pattern.

(7)

The device according to (6), further including:

a reporting unit configured to report the interleaving pattern to a terminal device.

(8)

The device according to any one of (1) to (7), wherein the radio resource is a frequency resource.

(9)

The device according to (8), wherein the frequency resource is a subcarrier.

(10)

The device according to any one of (1) to (7), wherein the radio resource is a time resource.

(11)

The device according to (10), wherein the time resource is a symbol, a slot, a subframe, or a radio frame.

(12)

The device according to any one of (1) to (11), wherein the adjustment unit dynamically or semi-statically performs the adjustment in a time direction.

(13)

The device according to (12), wherein the adjustment unit performs the adjustment at a predetermined cycle.

(14)

The device according to (12) or (13), wherein the adjustment unit performs the adjustment on the basis of a channel characteristic.

(15)

The device according to any one of (12) to (14), wherein the adjustment unit performs the adjustment when the number of layers included in the plurality of layers exceeds a predetermined number.

(16)

The device according to any one of (1) to (15), wherein the adjustment unit performs the adjustment when a predetermined combination of codewords is included in the plurality of codewords.

(17)

The device according to any one of (1) to (16), further including:

a reporting unit configured to report information regarding the adjustment to a terminal device.

(18)

A method performed by a processor, the method including:

generating, for each of a plurality of layers that are subject to non-orthogonal multiplexing using a codebook, a codeword of a layer from data of the layer on the basis of a codebook for the layer; and adjusting a radio resource to be used in transmission of a signal element included in a multiplexed codeword obtained by multiplexing of codewords of the plurality of layers.

(19)

A device including:

an acquisition unit configured to acquire information regarding adjustment of a radio resource to be used in transmission of a signal element included in a multiplexed codeword obtained by multiplexing of codewords of a plurality of layers; and a control unit configured to perform a reception process of a terminal device on the basis of the information, wherein the plurality of layers are layers that are subject to non-orthogonal multiplexing using a codebook, and each of the codewords of the plurality of layers is a codeword generated from data of a layer on the basis of a codebook for the layer.

(20)

A device including:

a generation unit configured to generate, on the basis of a codebook for a layer that is subject to non-orthogonal multiplexing using a codebook, a codeword of the layer from data of the layer; and an adjustment unit configured to adjust a radio resource to be used in transmission of a signal element included in the codeword.

(21)

A program causing a processor to execute:

generating, for each of a plurality of layers that are subject to non-orthogonal multiplexing using a codebook, a codeword of a layer from data of the layer on the basis of a codebook for the layer; and adjusting a radio resource to be used in transmission of a signal element included in a multiplexed codeword obtained by multiplexing of codewords of the plurality of layers.

(22)

A readable recording medium having a program recorded thereon, the program causing a processor to execute:

generating, for each of a plurality of layers that are subject to non-orthogonal multiplexing using a codebook, a codeword of a layer from data of the layer on the basis of a codebook for the layer; and adjusting a radio resource to be used in transmission of a signal element included in a multiplexed codeword obtained by multiplexing of codewords of the plurality of layers.

(23)

A method performed by a processor, the method including:

acquiring information regarding adjustment of a radio resource to be used in transmission of a signal element included in a multiplexed codeword obtained by multiplexing of codewords of a plurality of layers; and performing a reception process of a terminal device on the basis of the information, wherein the plurality of layers are layers that are subject to non-orthogonal multiplexing using a codebook, and each of the codewords of the plurality of layers is a codeword generated from data of a layer on the basis of a codebook for the layer.

(24)

A program causing a processor to execute:

acquiring information regarding adjustment of a radio resource to be used in transmission of a signal element included in a multiplexed codeword obtained by multiplexing of codewords of a plurality of layers; and performing a reception process of a terminal device on the basis of the information, wherein the plurality of layers are layers that are subject to non-orthogonal multiplexing using a codebook, and each of the codewords of the plurality of layers is a codeword generated from data of a layer on the basis of a codebook for the layer.

(25)

A readable recording medium having a program recorded thereon, the program causing a processor to execute:

acquiring information regarding adjustment of a radio resource to be used in transmission of a signal element included in a multiplexed codeword obtained by multiplexing of codewords of a plurality of layers; and performing a reception process of a terminal device on the basis of the information, wherein the plurality of layers are layers that are subject to non-orthogonal multiplexing using a codebook, and each of the codewords of the plurality of layers is a codeword generated from data of a layer on the basis of a codebook for the layer.

(26)

A method performed by a processor, the method including:

generating, on the basis of a codebook for a layer that is subject to non-orthogonal multiplexing using a codebook, a codeword of the layer from data of the layer; and adjusting a radio resource to be used in transmission of a signal element included in the codeword.

(27)

A program causing a processor to execute:

generating, on the basis of a codebook for a layer that is subject to non-orthogonal multiplexing using a codebook, a codeword of the layer from data of the layer; and adjusting a radio resource to be used in transmission of a signal element included in the codeword.

(28)

A readable recording medium having a program recorded thereon, the program causing a processor to execute:

generating, on the basis of a codebook for a layer that is subject to non-orthogonal multiplexing using a codebook, a codeword of the layer from data of the layer; and adjusting a radio resource to be used in transmission of a signal element included in the codeword.

REFERENCE SIGNS LIST 1 system
10 block
100 base station
101 cell
151 codeword generation unit
153 adjustment unit
155, 161 information acquisition unit
157, 163 reporting unit
200 base station
241, 251 information acquisition unit
243 control unit
253 codeword generation unit
255 adjustment unit

The invention claimed is:

1. A control device, comprising:
a processor configured to:
generate, for each layer of a plurality of layers that are subjected to non-orthogonal multiplexing, a codeword of a layer of the plurality of layers from data of the layer based on a codebook for the layer; and
exchange radio resources between at least two signal elements based on an interleaving pattern, wherein
the radio resources are utilized in transmission of the at least two signal elements that are included in at least one multiplexed codeword, and the at least one multiplexed codeword is obtained by multiplexing of a plurality of codewords of the plurality of layers.

2. The control device according to claim 1, wherein the at least one multiplexed codeword is a single multiplexed codeword.

3. The control device according to claim 1, wherein the exchange of the radio resources is through a cyclic shift.

4. The control device according to claim 1, wherein the processor is further configured to transmit information of the interleaving pattern to a terminal device.

5. The control device according to claim 1, wherein each of the radio resources is a frequency resource.

6. The control device according to claim 5, wherein the frequency resource is a subcarrier.

7. The control device according to claim 1, wherein each of the radio resources is a time resource.

8. The control device according to claim 7, wherein the time resource is a symbol, a slot, a subframe, or a radio frame.

9. The control device according to claim 1, wherein the processor is further configured to one of dynamically or semi-statically adjust the radio resources in a time direction.

10. The control device according to claim 9, wherein the processor is further configured to adjust the radio resources in a determined cycle.

11. The control device according to claim 9, wherein the processor is further configured to adjust the radio resources based on a channel characteristic.

12. The control device according to claim 9, wherein the processor is further configured to adjust the radio resources based on a count of the plurality of layers that exceeds a threshold number.

13. The control device according to claim 1, wherein the processor is further configured to adjust the radio resources based on a determined combination of codewords that is included in the plurality of codewords.

14. The control device according to claim 1, the processor is further configured to transmit information of the exchange to a terminal device.

15. A control method, comprising:
in a control device:
generating, by a processor, for each layer of a plurality of layers that are subjected to non-orthogonal multiplexing, a codeword of a layer of the plurality of layers from data of the layer based on a codebook for the layer; and
exchanging, by the processor, radio resources between at least two signal elements based on an interleaving pattern,
wherein the radio resources are utilized in transmission, of the at least two signal elements that are included in at least one multiplexed codeword, and
wherein the at least one multiplexed codeword is obtained by multiplexing of a plurality of codewords of the plurality of layers.

16. A communication device, comprising:
a processor configured to:
acquire adjustment information of a radio resource, wherein the adjustment information is utilized in transmission of a signal element that is included in a multiplexed codeword, and wherein the multiplexed codeword is obtained by multiplexing of a plurality of codewords of a plurality of layers;
execute a reception process of the communication device, based on the adjustment information,
wherein the plurality of layers are subjected to non-orthogonal multiplexing, and
wherein each codeword of the plurality of codewords is generated from data of a layer of the plurality of layers based on a codebook for the layer;
determine, based on the adjustment information, that the radio resource is adjusted using a specific pattern; and
acquire the multiplexed codeword based on the determination.

17. A control device, comprising:
a processor configured to:
generate, based on a codebook for a layer that is subjected to non-orthogonal multiplexing, a codeword of the layer from data of the layer; and
exchange radio resources between at least two signal elements based on an interleaving pattern,
wherein the radio resources are utilized in transmission of the at least two signal elements that are included in the codeword.

* * * * *